US011151526B2

(12) United States Patent
Haldenby et al.

(10) Patent No.: US 11,151,526 B2
(45) Date of Patent: Oct. 19, 2021

(54) SYSTEMS AND METHODS FOR ESTABLISHING AND ENFORCING TRANSACTION-BASED RESTRICTIONS USING HYBRID PUBLIC-PRIVATE BLOCKCHAIN LEDGERS

(71) Applicant: The Toronto-Dominion Bank, Mississauga (CA)

(72) Inventors: Perry Aaron Jones Haldenby, Mississauga (CA); Rajan Mahadevan, Mississauga (CA); John Jong Suk Lee, Waterloo (CA); Paul Mon-Wah Chan, Markham (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 1257 days.

(21) Appl. No.: 14/935,799

(22) Filed: Nov. 9, 2015

(65) Prior Publication Data

US 2017/0046698 A1 Feb. 16, 2017

Related U.S. Application Data

(60) Provisional application No. 62/204,768, filed on Aug. 13, 2015.

(51) Int. Cl.
*G06Q 20/38* (2012.01)
*G06Q 20/06* (2012.01)
(Continued)

(52) U.S. Cl.
CPC ......... *G06Q 20/0655* (2013.01); *G06F 21/62* (2013.01); *G06F 21/645* (2013.01);
(Continued)

(58) Field of Classification Search
CPC .................................................. G06Q 10/0833
(Continued)

(56) References Cited

U.S. PATENT DOCUMENTS 7,194,543 B2  3/2007  Corneille et al.
7,324,976 B2  1/2008  Gupta et al.
(Continued)

FOREIGN PATENT DOCUMENTS

EP        1693804           8/2006
WO    WO 2013/112642 A1    8/2013
WO    WO 2001/029777       2/2015

OTHER PUBLICATIONS

Herbert et al., "A Novel Method for Decentralised Peer-to-Peer Software License Validation Using Cryptocurrency Blockchain Technology," Proceedings of the 38th Australian Computer Science Conference, Jan. 27-30, 2015, pp. 27-35.
(Continued)

*Primary Examiner* — Chinedu C Agwumezie
(74) *Attorney, Agent, or Firm* — Duane Morris LLP

(57) ABSTRACT

The disclosed embodiments include computerized systems and methods that generate secured blockchain-based ledger structures that facilitate event-based control of tracked assets. In one embodiment, an apparatus associated with a rules authority of the secured blockchain-based ledger may obtain data indicative of an initiated transfer of funds between parties, and may access and decrypt a set of restrictions imposed on the initiated transfer and a set of rules associated with the restrictions, which may hashed into the secured blockchain-based ledger using a confidentially-held master cryptographic key. The apparatus may determine that the initiated transfer violates at least one of the
(Continued)

restrictions, and may perform operations consistent with at least one of the rules associated with the at least one violated restriction.

20 Claims, 5 Drawing Sheets

(51) Int. Cl.

| | | |
|---|---|---|
| G06F 21/64 | (2013.01) | |
| H04N 5/913 | (2006.01) | |
| G06Q 20/36 | (2012.01) | |
| G06Q 10/06 | (2012.01) | |
| G06Q 10/10 | (2012.01) | |
| G06Q 50/08 | (2012.01) | |
| G06Q 20/10 | (2012.01) | |
| G06Q 20/40 | (2012.01) | |
| G06F 21/62 | (2013.01) | |
| H04L 9/08 | (2006.01) | |
| G06Q 50/18 | (2012.01) | |
| H04L 9/32 | (2006.01) | |
| H04L 29/06 | (2006.01) | |
| G06Q 10/08 | (2012.01) | |
| G06Q 30/02 | (2012.01) | |
| G06Q 40/00 | (2012.01) | |
| G06Q 40/08 | (2012.01) | |

(52) U.S. Cl.
CPC . *G06Q 10/0631* (2013.01); *G06Q 10/063114* (2013.01); *G06Q 10/08* (2013.01); *G06Q 10/103* (2013.01); *G06Q 10/1097* (2013.01); *G06Q 20/065* (2013.01); *G06Q 20/102* (2013.01); *G06Q 20/367* (2013.01); *G06Q 20/3829* (2013.01); *G06Q 20/401* (2013.01); *G06Q 20/405* (2013.01); *G06Q 20/4016* (2013.01); *G06Q 30/0214* (2013.01); *G06Q 40/08* (2013.01); *G06Q 40/128* (2013.12); *G06Q 50/08* (2013.01); *G06Q 50/18* (2013.01); *H04L 9/0816* (2013.01); *H04L 9/0861* (2013.01); *H04L 9/0891* (2013.01); *H04L 9/0894* (2013.01); *H04L 9/3247* (2013.01); *H04L 63/061* (2013.01); *H04L 63/062* (2013.01); *H04L 63/0876* (2013.01); *H04N 5/913* (2013.01); *G06Q 2220/00* (2013.01); *G06Q 2220/10* (2013.01); *G06Q 2230/00* (2013.01); *H04L 63/0435* (2013.01); *H04L 63/0442* (2013.01); *H04L 63/08* (2013.01); *H04L 63/12* (2013.01); *H04L 2209/24* (2013.01); *H04L 2209/38* (2013.01); *H04L 2209/56* (2013.01); *H04N 2005/91342* (2013.01); *Y02P 90/80* (2015.11); *Y04S 10/50* (2013.01)

(58) Field of Classification Search
USPC .......................................................... 705/50
See application file for complete search history.

(56) References Cited

U.S. PATENT DOCUMENTS

| | | | |
|---|---|---|---|
| 7,703,140 | B2 | 8/2010 | Nath et al. |
| 8,135,134 | B2 | 3/2012 | Orsini et al. |
| 8,150,769 | B2 | 4/2012 | Gupta et al. |
| 8,327,138 | B2 | 12/2012 | Nath et al. |
| 8,347,088 | B2 | 1/2013 | Moore et al. |
| 9,014,661 | B2 | 4/2015 | DeCharms |
| 2002/0111907 | A1 | 8/2002 | Ling |
| 2002/0128917 | A1 | 9/2002 | Grounds |
| 2003/0126079 | A1 | 7/2003 | Roberson et al. |
| 2005/0024201 | A1 | 2/2005 | Culpepper et al. |
| 2005/0091173 | A1 | 4/2005 | Alve |
| 2006/0242038 | A1 | 10/2006 | Guidilli |
| 2006/0277127 | A1* | 12/2006 | Pierdinock ............. G06Q 40/10 705/35 |
| 2007/0046689 | A1 | 3/2007 | Tokimoto et al. |
| 2011/0100685 | A1 | 5/2011 | Silbert |
| 2014/0005809 | A1 | 1/2014 | Frei et al. |
| 2014/0344015 | A1 | 11/2014 | Puértolas-Montañés |
| 2015/0046337 | A1 | 2/2015 | Hu et al. |
| 2015/0081566 | A1 | 3/2015 | Slepinin |
| 2015/0127812 | A1* | 5/2015 | Cheng .................. G06F 3/0619 709/224 |
| 2015/0128240 | A1 | 5/2015 | Richards et al. |
| 2015/0220892 | A1 | 8/2015 | Allen |
| 2015/0371548 | A1 | 12/2015 | Samid |
| 2016/0065540 | A1 | 3/2016 | Androulaki et al. |
| 2016/0162897 | A1 | 6/2016 | Feeney |
| 2016/0210626 | A1 | 7/2016 | Ortiz |
| 2016/0253663 | A1 | 9/2016 | Clark |
| 2016/0259937 | A1* | 9/2016 | Ford ..................... G06F 21/577 |
| 2016/0260169 | A1 | 9/2016 | Arnold |
| 2016/0292680 | A1 | 10/2016 | Wilson, Jr. |
| 2016/0342989 | A1 | 11/2016 | Davis |
| 2016/0358165 | A1 | 12/2016 | Maxwell |
| 2017/0124556 | A1* | 5/2017 | Seger, II ................. H04L 69/40 |
| 2017/0177898 | A1 | 6/2017 | Dillenberger |
| 2017/0236217 | A1* | 8/2017 | Suggula ................ G06Q 40/12 705/30 |
| 2018/0323975 | A1* | 11/2018 | Curbera ............... H04L 9/3236 |

OTHER PUBLICATIONS

Danezis et al., "Centrally Banked Cryptocurrencies," May 26, 2015 (13 pages).
Noyen et al., "When Money Learns to Fly: Towards Sensing as a Service Applications Using Bitcoin," Sep. 20, 2014 (6 pages).
Lubani, "MEC in damage control over donor's lack of disbursement of funds for elections," The Oracle, Jun. 11, 2014 (3 pages).
Benchmark Consulting Services, LLC, "Construction Monitoring and Disbursement Control," retrieved from http://www.benchmark-consulting.com/construction-monitoring-and-disbursement-control.html on Nov. 3, 2015 (1 page).
"Open-source Internet of Things Micropayment Processing Hits the Market," Bitcointalk.org, Jul. 2015, retrieved from https://bitcointalk.org/index.php?topic=854280;imode on Sep. 30, 2016 (3 pages).
"How it Works," retrieved from https://toronto.car2go.com/how-it-works/ on Sep. 30, 2016 (8 pages).
Karame et al., "Pay as you Browse: Microcomputations as Micropayments in Web-based Services," Proceedings of WWW 2011—Session: E-commerce, Mar. 28-Apr. 1, 2011, pp. 307-316.
Ectors, M., "Five new businesses for Telefonica Digital," Sep. 21, 2011, retrieved from https://telruptive.com/tag/micro-payment on Sep. 30, 2016 (1 page).
Dawson, R., "The new layer of the economy enabled by M2M payments in the Internet of Things," Sep. 16, 2014, retrieved from http://rossdawsonblog.com/weblog/archives/2014/09/new-layer-economy-enabled-m2m-payments-internet-things.html on Sep. 30, 2016 (7 pages).
"Ajusto™ program with telematics device," retrieved from https://www.thepersonal.com/p-on/en-insurance-products/auto-insurance/pages/device-auto-insurance-program.aspx on Nov. 9, 2015 (2 pages).
Taylor, "Will Insurance Companies Use Smart Appliances to Monitor 'Unhealthy' Habits?" Old-Thinker News (retrieved from https://www.oldthinkernews.com/2013/10/21/will-insurance-companies-use-smart-appliances-to-monitor-unhealthy-habits), Oct. 22, 2013 (6 pages).
Porter et al., "How Smart, Connected Products are Transforming Competition," Harvard Business Review, Nov. 2014 (38 pages).

* cited by examiner

SYSTEMS AND METHODS FOR ESTABLISHING AND ENFORCING TRANSACTION-BASED RESTRICTIONS USING HYBRID PUBLIC-PRIVATE BLOCKCHAIN LEDGERS

CROSS-REFERENCE TO RELATED APPLICATIONS

This application claims the benefit of U.S. Provisional Patent Application No. 62/204,768, filed Aug. 13, 2015, which is expressly incorporated by reference herein to its entirety.

DESCRIPTION

Technical Field

The disclosed embodiments generally relate to computerized systems and methods for securing data, and more particularly, and without limitation, computerized systems and methods that generate secured blockchain-based ledger structures that facilitate event-based control of tracked assets.

Background

Today, virtual and crypto-currencies, such as Bitcoin™, are gaining acceptance as viable mechanisms for performing purchase transactions and other financial services transactions. The transfer of units of these virtual and crypto-currencies between owners, which is essential to the ultimate success of these virtual and crypto-currencies, relies on a robust blockchain ledger structure that, due to its public nature, redundant verification, and resistance to fraudulent activity, offers advantages over existing centralized server systems. Despite its many advantages, these conventional systems exhibit significant flaws, especially when used to track assets in secure, high-risk, and/or sensitive applications.

For example, transferred units of virtual and crypto-currencies may be earmarked for certain purposes and/or for purchases of certain goods and services. While capable of identifying and tracking executed transactions involving the transferred funds, conventional database-oriented and blockchain-ledger-based systems and architectures are often unable to systemically establish or effectively enforce usage restrictions of the transferred funds prior to transaction initiation.

SUMMARY

The disclosed embodiments relate to computerized systems and methods that generate secured blockchain-based ledger structures that facilitate event-based control of tracked assets.

In one embodiment, an apparatus includes at least one processor and a memory storing executable instructions that, when executed by the at least one processor, causes the at least one processor to perform the step of accessing data corresponding to at least one blockchain ledger. In one aspect, the blockchain ledger data may identify a first transfer of funds from a first party to a second party. The executed instructions may further cause the at least one processor to perform the step of obtaining transaction data indicative of an initiation of a second transfer of a portion of the funds from the second party to at least one third party. The executed instructions may further cause the at least one processor to perform the step of decrypting (i) a first encrypted portion of data corresponding to at least one blockchain ledger using a first cryptographic key and (ii) a second encrypted portion of the blockchain ledger data using a second cryptographic key. In some aspects, the decrypted first data portion may identify one or more restrictions imposed on the second transfer by the first party, the transfer restrictions being controlled by a rules authority, and the decrypted second data portion may identify a plurality of rules associated with the one or more restrictions. The executed instructions may further cause the at least one processor to perform the steps of establishing, based on the obtained transaction data and the first encrypted data portion, that the initiated second transfer violates with at least one of the imposed restrictions, identifying, based on the decrypted second data portion, at least one of the rules that exhibits a causal relationship with the at least one violated restriction, and generating an electronic command to perform one or more operations consistent with the at least one identified rule.

In additional embodiments, a computer implemented method includes accessing, using at least one processor, data corresponding to at least one blockchain ledger. In one aspect, the blockchain ledger data may identify a first transfer of funds from a first party to a second party. The method may obtain, using the at least one processor, transaction data indicative of an initiation of a second transfer of a portion of the funds from the second party to at least one third party, and using the at least one processor, decrypt (i) a first encrypted portion of data corresponding to at least one blockchain ledger using a first cryptographic key and (ii) a second encrypted portion of the blockchain ledger data using a second cryptographic key. In some aspects, the decrypted first data portion may identify one or more restrictions imposed on the second transfer, the transfer restrictions being controlled by a rules authority, and the decrypted second data portion may identify a plurality of rules associated with the one or more restrictions. Based on the obtained transaction data and the first encrypted data portion, the method may include establishing, using the at least one processor, that the initiated second transfer violates with at least one of the imposed restrictions. The method may also include identifying, using the at least one processor, and based on the decrypted second data portion, at least one of the rules that exhibits a causal relationship with the at least one violated restriction, and generating, using the at least one processor, an electronic command to perform one or more operations consistent with the at least one identified rule.

In other embodiments, a tangible, non-transitory computer-readable medium stores instructions that, when executed by the at least one processor, cause the at least one processor to perform a method comprising the step of accessing data corresponding to at least one blockchain ledger. In one aspect, the blockchain ledger data may identify a first transfer of funds from a first party to a second party. The method may also include the steps of obtaining transaction data indicative of an initiation of a second transfer of a portion of the funds from the second party to at least one third party, and decrypting (i) a first encrypted portion of data corresponding to at least one blockchain ledger using a first cryptographic key and (ii) a second encrypted portion of the blockchain ledger data using a second cryptographic key. In some aspects, the decrypted first data portion may identify one or more restrictions imposed on the second transfer, the transfer restrictions may be controlled by a rules authority, and the decrypted second data portion may identify a plurality of rules associated with the one or more restrictions. The method may also include the steps of establishing, based on the obtained transaction data and the first encrypted data portion, that the initiated second transfer violates with at least one of the imposed restrictions, identifying based on the decrypted second data portion, at least one of the rules that exhibits a causal relationship with the at least one violated restriction, and generating an electronic command to perform one or more operations consistent with the at least one identified rule.

It is to be understood that both the foregoing general description and the following detailed description are exemplary and explanatory only, and are not restrictive of the disclosed embodiments as claimed. Further, the accompanying drawings, which are incorporated in and constitute a part of this specification, illustrate aspects of the present disclosure and together with the description, serve to explain principles of the disclosed embodiments as set forth in the accompanying claims

DETAILED DESCRIPTION

Figure 1:
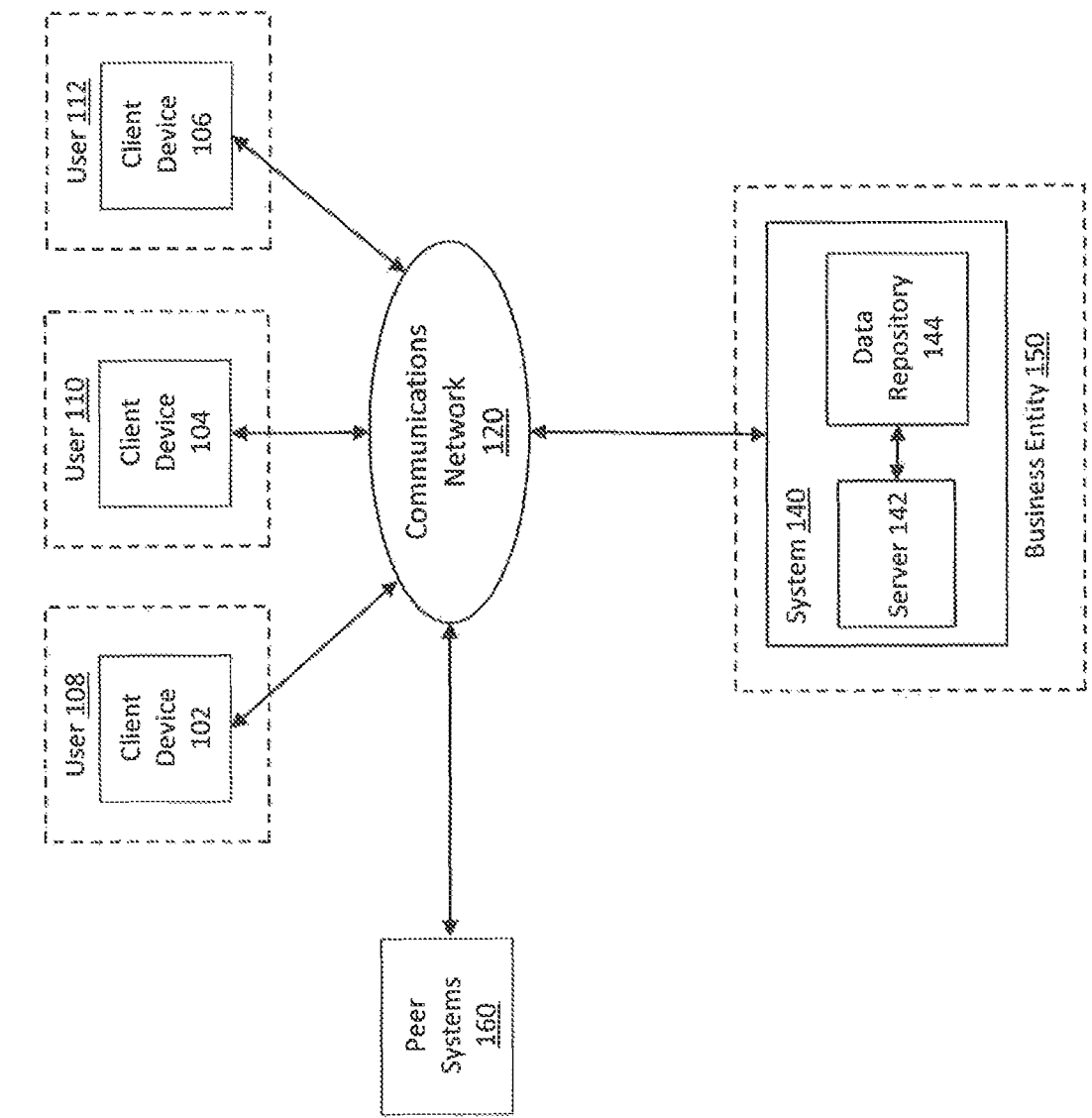
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

I. Exemplary Computing Environments Networks, Systems and Devices

FIG. 1 illustrates an exemplary computing environment 100 consistent with certain disclosed embodiments. In one aspect, computing environment 100 may include client devices 102, 104, and 106, system 140, peer systems 160, and a communications network 120 connecting one or more of the components of environment 100.

Consistent with the disclosed embodiments, one or more of the components of computing environment 100 may be configured to address problems inherent to conventional blockchain-based ledgers by embedding a private-master encryption key architecture into a conventional blockchain architecture (e.g., a blockchain-based architecture associated with the public Bitcoin™ ledger). In some aspects, the resulting hybrid blockchain architecture may facilitate a selective encryption of information by client devices 102, 104, and 106, system 140, and/or peer systems 160, thus providing a technical solution that protects sensitive and/or confidential instructions sets and event triggers and corresponding confidential instructions sets.

a. Exemplary Client Devices

In one embodiment, client devices 102, 104, and/or 106 may include a computing device, such as, but not limited to, a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, at least one of client devices 102, 104, and/or 106 may be associated with one or more users, such as users 108, 110, and/or 112. For instance, user 110 may operate client device 104 and may do so to cause client device 104 to perform one or more operations consistent with the disclosed embodiments.

Client devices 102, 104, and/or 106 may include one or more tangible, non-transitory memories that store data and/or software instructions, and one or more processors configured to execute software instructions. Client devices 102, 104, and/or 106 may include one or more display devices that display information to a user and one or more input device(s) to allow the user to input information to client device 102, 104, and/or 106 (e.g., keypad, keyboard, touchscreen, voice activated control technologies, or any other type of known input device).

In one aspect, client devices 102, 104, and/or 106 may store in memory one or more software applications that run on client device 104 and are executed by the one or more processors. In some instances, client device 104 may store software applications that, when executed by one or more processors, perform operations that establish communications with one or more of peer systems 160 (e.g., across network 120) and that obtain, from peer systems 160, a current version of a hybrid blockchain ledger generated and maintained in accordance with the disclosed embodiments.

In other instances, and as described below, one or more of client devices 102, 104, and/or 106 may execute the one or more stored software application and to obtain data from the hybrid blockchain ledger that includes, but not limited to, data identifying one or more tracked assets, and/or a public key of one or more users. Further, and as described below, the one or more executed software applications may cause client devices 102, 104, and/or 106 to extract, from the one or more accessed blocks, a copy of an encrypted and/or hashed ownership/rules portion of the transaction block (e.g., including the identification a holder of a master key) and/or a copy of an encrypted and/or hashed master data block (e.g., encrypted using the master key and including rules permitting preconfigured and/or actions involving the tracked assets). In additional instances, and as further described below, client devices 102, 104, and/or 106 may provide information associated with one or more actions or transactions involving the tracked assets (e.g., information identifying the actions or transaction, information identifying the assets, a public key, a digital signature, etc.) to peer systems 160, along with copies of the encrypted and/or hashed rules engines and lists of triggering events.

In some aspects, the one or more stored applications may include a wallet application provided by business entity 150 (e.g., a mobile wallet application or an application executable on a desktop computer) and capable of initiating transactions denominated in one or more currencies, including virtual currencies such as Bitcoin™.

b. Exemplary Computer Systems

System 140 may be a computing system configured to execute software instructions to perform one or more operations consistent with disclosed embodiments. In one aspect, system 140 may be associated with a business entity 150 (e.g., a financial institution) that provides financial accounts, financial services transactions, and investment services one or more users (e.g., customers of the business entity 150). In some aspects, system 140 may be a distributed system that may include computing components distributed across one or more networks, such as network 120, or other networks.

In one aspect, system. 140 may include computing components configured to store, maintain, and generate data and software instructions. For example, system 140 may include one or more servers (e.g., server 142) and tangible, non-transitory memory devices (e.g., data repository 144). Server 142 may include one or more computing devices that may be configured to execute software instructions to perform one or more processes consistent with the disclosed embodiments. In one example, server 142 may be a computing device that executes software instructions that perform operations that provides information to one or more other components of computing environment 100.

In one embodiment, server 142 may include a computer (e.g., a personal computer, network computer, or mainframe computer) having one or more processors that may be selectively activated or reconfigured by a computer program. In one aspect, server 142 (or other computing components of system 140) may be configured to provide one or more websites, digital portals, etc., that provide services consistent with business entity 150, such as a digital banking or investment portal, and services consistent with disclosed embodiments. For instance, server 142 may be configured to provide information associated with a requested web page over communications network 120 to client device 104, which may render the received information and present content from the web page on a display device, e.g., a touchscreen display unit.

In other aspects, server 142 (or other computing components of system 140) may be configured to provide information to one or more application programs executed by client device 104 (e.g., through a corresponding application programming interface (API)). For example, client device 104 may execute an application program associated with and provided by business entity 150, such a mobile banking application and/or a mobile wallet application, to provide services consistent with the disclosed embodiments. In some instances, server 142 may provide information to client devices 102, 104, and/or 106 (e.g., through the API associated with the executed application program), and client devices 102, 104, and/or 106 may be configured by the executed application program to present portions of the information to corresponding users through a corresponding graphical user interface (GUI).

In further aspects, server 142 (or other computing components of system 140) may be configured to provide to client devices 102, 104, and/or 106 (and/or receive from client device 104) information associated with services provided by business entity 150. For example, client device 104 may receive the transmitted information, and store portions of the information in locally accessible storage device and/or network-accessible storage devices and data repositories (e.g., cloud-based storage). In one instance, client device 104 may execute stored instructions (e.g., an application program, a web browser, a mobile banking application, and/or a mobile wallet application) to process portions of the stored data and render portions of the stored data for presentation to user 110. Additionally, server 142 may be incorporated as a corresponding node in a distributed network, and additionally or alternatively, as a corresponding networked server in a cloud-computing environment. Furthermore, server 142 may communicate via network 120 with one or more additional servers (not shown), which may facilitate the distribution of processes for parallel execution by the additional servers.

In further aspects, business entity 150 may represent a "controlling entity" capable of regulating transactions assets (e.g., units of virtual currency, units of various financial instruments, physical assets, etc.) tracked within hybrid public-private ledgers consistent with the disclosed embodiments. By way of example, one or more computing components of system 140 (e.g., server 142) may be configured (e.g., by executed software instructions) to establish one or more rules that regulate a distributions of and/or transactions associated with the tracked assets, an initiation of transfers of the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.).

Additionally, in some aspects, system 140 may establish causal relationships between one or more of the established rules and one or more events that trigger an initiation of one or more corresponding regulated distributions, transfers, and/or other actions involving assets tracked within the hybrid public-private ledger (e.g., "triggering events"). For example, a confirmed loss of a private cryptographic key issued to user 110 may represent a triggering event that causes system 140 to verify user 110's identity, initiate a transaction of the orphaned assets, generate a new pair of public and private cryptographic keys for user 110 (i.e., public and private blockchain keys), and transmit at least the private blockchain key to user 110 through secure, non-accessible processes, in accordance with one or more of the established rules.

Further, by way of example, a theft of a portion of user 110's tracked assets (e.g., units of virtual currency specified within one of more blocks of the hybrid public-private ledger) may represent a triggering event that causes system 140 to initiate a recovery protocol to generate a transaction request to recover the value of the stolen assets (e.g., to transfer the stolen assets back to user 110), and further, to generate a new pair of public and private blockchain keys for user 110, as described above. In other instances, a death and/or incapacitation of user 110 may represent a triggering event that causes system 140 to initiate a series of transaction to distribute of at least a portion of the tracked assets (e.g., through corresponding transaction requests consistent with the disclosed embodiments) to one or more additional owners identified by user 110 and specified within corresponding ones of the identified rules.

In some aspects, system 140 may be configured to establish one or more of the rules, and further, one or more of the causal relationships and triggering events, based on internal regulations associated with business entity 150. For example, the one or more internal regulations associated with business entity 150 may specify that system 140 verify an identity of user 110 (e.g., based on various forms of multi-factor authentication data) and/or obtain specific elements of documentation (e.g., a police report, etc.) prior to initiating the lost private key protocol and/or the recovery protocols outlined above. In other aspects, system 140 may one or more of the rules and/or triggering events based on information received from user 110 (e.g., as input provided to a web page or other graphical user interface (GUI) presented by client device 104 and provided to system 140). For example, user 110 may specify, as input to the web page or GUI presented by client device 104, one or more individuals that would receive portions of the tracked assets upon completion of one or more tasks and/or in the event of user 110's accidental death. The disclosed embodiments are, however, not limited to the exemplary triggering events and established rules described above, and in further aspects, the disclosed embodiments may be configured to generate any additional or alternate user- and system-specified rules and triggering events consistent with the hybrid public-private ledger and appropriate to the tracked assets, user 110, and/or business entity 150 (i.e., acting as a rules authority for the hybrid public-private ledger).

Further, and as outlined below, system 140 may be configured to store the one or more established rules (e.g., as a rules engine) and one or more of the established triggering events (e.g., as an event trigger list) within a portion of a local data repository (e.g., data repository 144). Additionally or alternatively, system 140 may be configured to store portions of the rules engine and/or event trigger list within a secure data repository accessible to system 140 across network 120 (e.g., cloud-based storage).

As described above, one or more computing components of system 140 (e.g., server 142) may be configured to generate pairs of public and private blockchain keys for user 110 (e.g., user 110's public/private blockchain key pair), and to provide the generated private blockchain key to user 110 through secure, non-accessible and/or out-of-band communications (e.g., by mail, etc.). In further embodiments, the one or more components of system 140 (e.g., server 142) may be configured to generate and maintain additional cryptographic keys that facilitate a generation and maintenance of portions of the hybrid public-private ledger. For instance, system 140 may be configured to generate a master key, which system 140 may leverage to encrypt the stored rules engine. In certain aspects, system 140 may store copies of the generated master key in a portion of data repository 144 that is not accessible to user 110 (and any other users), thus maintaining a confidence of the generated master key.

In additional aspects, system 140 may be configured to generate and maintain a private crypto key on behalf of user 110 (and additionally or alternatively, user 108 and 112), which system 140 may leverage to encrypt the stored event trigger list, and which may be provided to user 110 (and/or to user 108 and 112) through secure, non-accessible and/or out-of-band communications. Further, and as described above, system 140 may store copies of the private crypto keys in a portion of data repository 144.

Further, in additional embodiments, one or more computing components of system 140 (e.g., server 140) may be configured to hash the generated (and encrypted) rules engine and event trigger list into a genesis block associated with the hybrid public-private ledger. In other aspects, system 140 may provide the encrypted rules engine and event triggers list to one or more of peer system 160, which may be configured to hash the encrypted rules engine and event trigger list into the genesis block. By way of example, and by hashing the encrypted rules engine and event trigger list into the genesis block of the hybrid public-private ledger, the disclosed embodiments enable an in-band communication of the encrypted rules engine and event triggers from user to user within blocks (e.g., transactions) of the hybrid public-private ledger c. Exempla Data Repositories and Stored Data Data repository 144 may include one or more memories that are configured to store and provide access to data and/or software instructions. Such memories may include tangible non-transitory computer-readable media that store software instructions that, when executed by one or more processors (e.g., of server 132), perform one or more operations consistent with disclosed embodiments. Data repository 144 may also be configured to store information relating to business entity 150, e.g., a financial institution.

For instance, data repository 144 may store customer data that uniquely identifies customers of a financial institution associated with system 140. By way of example, a customer of the financial institution (e.g., users 108, 110, and/or 112) may access a web page associated with system 140 (e.g., through a web server executed by a corresponding front end), and may register for digital banking services and provide data, which may be linked to corresponding ones of users 108, 110, and/or 112, and stored as customer data within data repository 144. The stored customer data may, for example, include personal information, government-issued identifiers, employment information, and contact information. The stored customer data may also include authentication credentials associated with registered users of the financial institution (e.g., a user name, a user-specified password, a system-generated password, an alphanumeric identification number (e.g., a PIN number) specified by the users or assigned by financial system 140, biometric information, and information facilitating enhanced authentication techniques).

In additional aspects, and as described above, data repository 144 may store a rules engine identifying one or more rules that regulate a distribution of the tracked assets, an initiation of one or more transactions involving the tracked assets (e.g., a sale, a transfer in ownership, a use of the tracked assets as collateral in a secured transaction etc.), and further, any additional or alternate action involving the tracked assets and/or the hybrid public-private ledger (e.g., processes that generate additional cryptographic key sets for users 108, 110, and/or 112, processes that recover assets racked in the hybrid public-private ledger, etc.). Further, and as described above, data repository 144 may also store information identifying an event triggers list that identifies causal relationships established by system 140 between one or more of the established rules and one or more events that trigger an initiation of one or more corresponding regulated distributions, transactions, and/or assets tracked within the hybrid blockchain ledger (e.g., "triggering events").

In some aspects, system 140 may be configured to establish one or more of the rules, and further, one or more of the causal relationships and triggering events, based on one or more internal regulations associated with business entity 150. In other aspects, system 140 may establish one or more of the rules and/or triggering events based on information received from one or more of users 108, 110, and/or 112 (e.g., as input provided to a web page or other graphical user interface (GUI) presented by client devices 102, 104, and/or 106 and provided to system 140).

In an embodiment, data repository 144 may also store a copy of a master key and private crypto keys associated with users 108, 110, and 112 (and additionally or alternatively, additional private crypto keys associated with other users). By way of example, system 140 may be configured to store the private crypto keys in a data structure that includes information that associates the private crypto keys with corresponding ones of user 108, 110, and 112, and further, may be configured to store the master key in a data structure within data repository 144 that is inaccessible to users 108, 110, and/or 112 (and additionally or alternatively, to other users). Further, in some aspects, data repository 144 may be configured to store the rules engine and/or event triggers list in raw, unencrypted form. In other aspects, consistent with the disclosed embodiments, data repository 144 may be configured to store the rules engine and/or event triggers in encrypted form (e.g., using the stored master key), and/or store a hashed representation of the rules engine and/or the event triggers list.

d. Exemplary Communications Networks

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

e. Exempla Peer Systems

Referring back to FIG. 1, peer systems 160 may include one or more computing systems configured to execute software instructions to perform one or more operations consistent with disclosed embodiments. In some aspects, peer systems 160 may include computing components configured to store, maintain, and generate data and software instructions. For example, each of peer systems 160 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In an embodiment, one or more of peer system 160 may be configured to receive, from client device 104 across network 120, information associated with a distribution of, transaction involving, or other action associated with one or more assets tracked within hybrid blockchain ledgers consistent with the disclosed embodiments. By way of example, the received information may include, but is not limited to, data identifying at least a portion of the tracked assets, data identifying a current owner of the portion of the tracked assets (e.g., user 110) (or a obfuscated owner identifier), and further, encrypted copies of and/or hash values representative of the rules engine and event triggers list.

In some aspects, the one or more of peer systems 160 may be configured (e.g., by the executed software programs) to validate the received information and to generate a new block of the hybrid blockchain ledger that includes the received information, either alone (e.g., using a "one transaction, one block" paradigm) or in combination with information identifying additional distributions, transactions, or other actions associated with one or more tracked assets (e.g., as a multiple-transaction block). The one or more of peer systems 160 may be further configured to generate one or more hashes representative of the new block, which may be appended to a prior version of the hybrid private-public ledger along with the newly generated block. In some aspects, the one or more of peer system 160 may maintain the updated versions of the hybrid private-public ledger (i.e., the latest, longest hybrid private-public ledger), and may provide the updated version of the hybrid private-public ledger to client devices 102, 104, and/or 106 (and additionally or alternatively, other client devices associated with other users) upon receipt of a request across network 120 and/or at regular or predetermined intervals.

In certain instances, and in addition to a connection with network 120, peer systems 160 may be interconnected across a peer-to-peer network (not depicted in FIG. 1) using any of the wired or wireless communications protocols outlined above. Further, in some instances, one or more of peer systems 160 may function as a "miner," where any miner may be compensated in units of a virtual currency (e.g., Bitcoin™) for validating the received data and for generating updated versions of the hybrid blockchain ledger.

II. Exemplary Processes for Tracking Assets Using Hybrid Private-Public Ledgers

In some embodiments, client devices 102, 104, and/or 106 may execute one or more stored applications that enable corresponding users to track, in conjunction with peer systems 150 and other components of computing environment 100, a disposition and distribution of one or more assets using conventional, publicly available and transparent blockchain ledgers. In some aspects, the use of public blockchain ledgers to track ownership, disposition, and distribution of actual and/or virtual assets (e.g., unit of virtual currencies, such as Bitcoin™, unit of other financial instruments and securities, physical assets, etc.) may present advantages over existing centralized server systems, such as those provided by financial institutions that leverage private ledgers.

a. Asset Tracking Using Conventional Blockchain Ledgers

Figure 2:
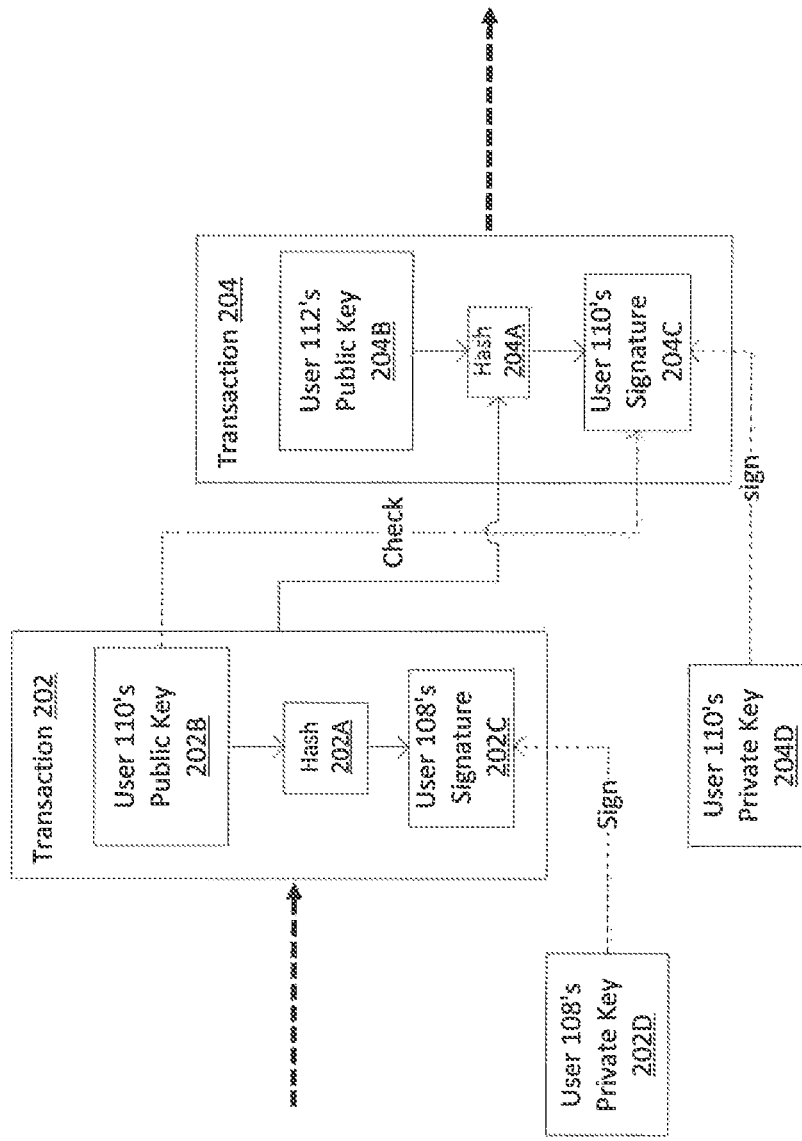
FIG. 2 is a schematic diagram illustrating a conventional blockchain ledger architecture.

FIG. 2 is a schematic diagram of an exemplary structure 200 of a conventional blockchain ledger, which may be generated through the interaction of components of computing environment 100. For example, as described in reference to FIG. 2, a user (e.g., user 110) may be associated with a device (e.g., client device 104) that executes a stored software application (e.g., a wallet application) capable of obtaining a current version of a conventional blockchain ledger from one or more networked computer systems (e.g., one of peer systems 160 configured to "mine" broadcasted transaction data and update ledgers). In some aspects, the current version of a conventional blockchain ledger may represent a "longest" blockchain ledger that includes a maximum number of discrete "blocks," which may identify transactions that transfer, distribute, etc., portions of tracked assets among various owners, including user 110.

For example, client device 104 may obtain the current blockchain ledger, and may process the block chain ledger to determine that a prior owner (e.g., user 108) transferred ownership of a portion of the tracked assets to user 110 in a corresponding transaction (e.g., transaction 202, schematically illustrated in FIG. 2). As described above, one or more of peer systems 160 may have previously verified, processed, and packed the data associated with transaction 202 into a corresponding block of the conventional blockchain using any of the exemplary techniques described above and/or apparent to one of ordinary skill in the art.

In some aspects, as illustrated in FIG. 2, transaction 202 may include input data that references one or more prior transactions (e.g., transactions that transferred ownership of the tracked asset portion to user 108), and further, output data that includes instructions for transferring the tracked asset portion to one or more additional owners (e.g., user 110). For example, input data consistent with the disclosed embodiments may include, but is not limited to, a cryptographic hash of the one or more prior transactions (e.g., hash 202A) and the set of rules and triggers associated with the assets while the output data consistent with the disclosed embodiments may include, but is not limited to, a quantity or number of units of the tracked asset portion that are subject to transfer in transaction 202 and a public key of the recipient (e.g., public key 202B of user 110).

Further, in some aspects, the transaction data may include a digital signature 202C of user 108 (e.g., the prior owner), which may be applied to hash 202A and public key 202B using a private key 202D of user 108 through any of a number of techniques apparent to one of skill in the art and appropriate to the conventional blockchain ledger architecture. By way of example, the presence of user 108's public key within transaction data included within the conventional blockchain ledger may enable client device 104 and/or peer systems 160 to verify user 108's digital signature, as applied to data associated with transaction 202.

In an embodiment, user 110 may elect to further transfer the tracked asset portion to an additional user (e.g., user 112). For example, as described above, client device 104 may execute one or more software applications (e.g., wallet applications) that generate input and output data specifying a transaction (e.g., transaction 204 of FIG. 2) that transfers ownership of the tracked asset portion from user 110 to user 112, and further, that transmit the generated data to one or more of peer systems 160 for verification, processing (e.g., additional cryptographic hashing) and inclusion into a new block of the clock-chain ledger.

For example, data specifying transaction 204 may include, but is not limited to, a cryptographic hash 204A of prior transaction 202, a quantity or number of units of the tracked asset portion that are subject to transfer in transaction 204, and a public key of the recipient (e.g., public key 204B of user 112). Further, in some aspects, the data specifying transaction 204 may include a digital signature 204C of the user 110, which may be applied to hash 204A and public key 204B using a private key 204D of user 110 using any of the exemplary techniques described above. Further, and by way of example, the presence of user 110's public key 202B within transaction data included within the conventional blockchain ledger may enable various devices and systems (e.g., client devices 102, 104, and/or 106, peer systems 160, etc.) to verify user 110's digital signature 204C, as applied to data specifying transaction 204.

As described above, one or more of peer systems 160 may receive the data specifying transaction 204 from client device 104. In certain instances, peer systems 160 may act as "miners" for the blockchain ledger, and may competitively process the received transaction data (either alone or in conjunction with other data) to generate additional blocks of the ledger, which may be appended to the blockchain ledger and distributed across peer systems 160 (e.g., through a peer-to-peer network) and to other connected devices of environment 100.

In some aspects, conventional blockchain ledger architectures described above may enable the public to review content of the ledgers and verify ownerships. Further, the decentralized nature of conventional blockchain ledgers may also enable multiple distributed networks to verify the contents of a single ledger. The resulting redundancy may render conventional blockchain ledger architecture more robust than centralized server systems, and effectively eliminate the falsification of ledger data by malicious parties.

Despite these advantages, conventional blockchain ledger architectures may exhibit significant flaws when implemented by secured, high-risk systems. By way of example, unencrypted conventional ledger blocks may represent a security concern for transactions of sensitive nature, and further, may represent a privacy concern for members of the general public. For instance, information indicative of an interaction of a prior asset owner and a corresponding device, as present within conventional blockchain ledgers, may represent private information that should not be available to future owners, let alone members of the public.

Further, if an owner were to lose or misplace a corresponding private key, the distributed nature of conventional blockchain ledger architectures, such as those described above, provide little recourse to recover possession of the one or more tracked assets. In certain aspects, the rigidity and inflexibility of these conventional blockchain ledger architectures, and their inability to adapt to changing circumstances (e.g., loss of private keys, theft of tracked assets due to fraudulent or malicious activity), often results in volatility in the usage of the tracked assets and an erosion in a public trust of conventional blockchain ledgers.

Thus, there is a need for improved systems and methods that not only enhance the security of blockchain ledger architectures for use high-risk, sensitive applications, but that also provide a framework that provides owners or holders of assets tracked by blockchain ledger architectures with recourse in an event of fraud or malicious activity, while maintaining the public availability and verification characteristic of blockchain ledgers.

b. Exemplary Hybrid Public-Private Blockchain Ledger Architectures

The disclosed embodiments address these and other problems associated with conventional block-ledger architectures in a technical manner, by providing computer-implemented systems and methods that augment a conventional blockchain ledger with a private-master encryption key architecture that, in conjunction with an owner's pair of public and private blockchain keys, selectively encrypt ledger data to protect both a privacy of owners of tracked assets and a confidentiality of existing instruction sets maintained within the blockchain ledger.

Further, by incorporating an encrypted rules engine and corresponding list of triggering events (e.g., an event triggers list) into each block of the conventional blockchain ledger architecture (and thus generating a hybrid, public-private blockchain architecture), computer-implemented systems and methods consistent with the disclosed embodiments may perform operations that provide owners or holders tracked assets with recovery options in an event of fraud or malicious activity, while maintaining the public availability and verification characteristic of conventional blockchain ledgers.

In certain aspects, discrete data blocks of the conventional blockchain ledgers (e.g., as outlined above in reference to FIG. 2) and of the hybrid blockchain ledgers (e.g., as described in reference to FIG. 3) may include common elements of data that may specify transactions that distribute, transfer, and/or otherwise act upon portions of tracked assets. For example, these common data elements may include, but are not limited to, input data that references one or more prior transactions (e.g., a cryptographic hash of the one or more prior transactions), output data that includes instructions for transferring the tracked asset portion to one or more additional owners (e.g., a quantity or number of units of the tracked asset portion that are subject to the transaction and a public key of the recipient) and further, a digital signature applied to the input and/or output data using a corresponding public key of a current owner of the tracked asset portion. The disclosed embodiments are, however, not limited to exemplary transactions that include a transfer of tracked assets and to the exemplary data elements described above, and in further embodiments, discrete blocks of the hybrid blockchain ledgers may represent any additional or alternate transaction appropriate to the tracked assets, and further, any additional or alternate data appropriate to the tracked assets and to the transaction.

In contrast to the conventional blockchain ledgers described above, the disclosed embodiments may establish a "rules authority" capable of vetting real-time transactions (e.g., distributions, transfers, and/or other actions) involving portions of assets tracked within the exemplary hybrid blockchain ledger architectures described herein, and further, of establishing and maintaining rules (e.g., through a rules engine and corresponding list of triggering events) that facilitate regulatory-based, policy-based, and customer-specified controls of transactions involving the tracked assets (e.g., units of virtual currency, etc.).

For example, and as described above, business entity 150 may represent the rules authority, and one or more computing components of system 150 may perform operations that establish the rules engine and the list of triggering events, which may be stored within a secure data repository (e.g., data repository 144). In some aspects, the generated and stored rules engine may identify one or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets racked in the hybrid public-private ledger, etc.). Further, and as described above, the generated and stored list of triggering events may include information that specifies causal relationships between one or more of the established rules and one or more events that trigger an initiation of one or more corresponding regulated distributions, transactions, and/or actions associated with assets tracked within the hybrid public-private ledger (e.g., the triggering events).

In some aspects, system 140 may establish one or more of the rules and/or triggering events to reflect regulations and/or policies promulgated by governmental entity, a financial regulator, and/or the rules authority. For example, system 140 may establish a loss of a private key by user 110 as a "triggering event" that would cause system 140 to perform operations that create a new transaction and generate a new pair of public and private blockchain keys for user 110 in response to a verification of particular authentication credentials. In other aspects, system 140 may establish one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, distributions to other owners, etc.) in response to an accident involving user 110 and/or user 110's death (e.g., triggering events).

In further contrast to the conventional blockchain ledgers described above, one or more computing components of system 140 (e.g., server 142 upon execution of stored instructions) may generate additional cryptographic keys that facilitate the exemplary regulation of transactions (e.g., distributions, transfers, and/or actions) involving assets tracked within the hybrid public-private ledger. By way of example, system 140 may generate a master cryptographic key with which system 140 may encrypt the generated and stored rules engine. In some aspects, system 140 may store copies of the generated master key in a portion of data repository 144 that is not accessible to user 110 (and any other users), thus maintaining a confidence of the generated master key.

System 140 may also perform operations that encrypt the generated list of triggering events, either alone or in conjunction with metadata identifying the rules authority and/or information facilitating a processing of the transaction blocks throughout the hybrid blockchain ledger. In certain aspects, system 140 may also perform operations that generate and maintain additional private cryptographic keys (e.g., a private "crypto" key) associated with each owner associated with the assets tracked within the hybrid blockchain ledger (e.g., users 108, 110, and/or 112) and further, that would enable the owners to decrypt and access the list of triggering events and additionally or alternatively, the metadata identifying the rules authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

The disclosed embodiments may also be configured to communicate the encrypted and/or hashed rules engine and list of triggering events to owners of and/or user associated with the tracked assets through "in-band" communication processes, such as through an incorporation of the encrypted rules engine and list of triggering events into the transaction blocks of the hybrid blockchain ledger. For example, system 140 may perform operations that hash the encrypted rules engine and list of triggering events into a genesis block of the hybrid blockchain ledger, the contents of which may be incorporated (e.g., by client devices 102, 104, and/or 106, peer systems 160, etc.) into each of the subsequent transaction blocks generated and appended to the hybrid blockchain ledger. In some aspects, by incorporating the hashed and encrypted rules engine and list of triggering events into blocks of the hybrid blockchain ledger, the disclosed embodiments may ensure that the established rules are followed even in an event of actions by malicious parties to disrupt the tracked assets (e.g., instances of Bitcoin™ peeling, etc.)

Further, in some instances, the additional private crypto keys held by the owners and/or users (e.g., stored in corresponding ones of client devices 102, 104, and/or 106 and accessible to executable application programs) may enable the owners and/or users to access the encrypted list of triggering events maintained within the hybrid blockchain ledger. The owners and/or user may, through corresponding client devices, view the individual events that, when detected by system 140, could cause system 140 to perform operations that recover, authorize, audit, and/or verify the transaction and/or ownership data included within the hybrid blockchain ledger (e.g., associated with corresponding portions of the tracked assets).

In certain aspects, one or more computing components of system 140 may perform operations that modify portions of the stored rules and/or list of triggering events, e.g., in response to changes in regulations and/or policies, in response to additional owner input, etc. In order to access and modify the generated rules engine (and/or the list of triggering events) maintained within the hybrid blockchain ledger, system 140 may leverage the stored master cryptographic key to access and modify the hashed and encrypted rules engine. System 140 may, in certain instances, encrypt and re-hash the modified rules engine and submit the encrypted and hashed modified rules engine to one or more of peer systems 160 for inclusion in a block of the hybrid blockchain ledger. For example, the one or more of peer systems 160 may incorporate the hashed and encrypted modified rules engine into the hybrid blockchain ledger as a special transaction (e.g., a "0" value transaction), such that the hybrid blockchain ledger tracks each change within the modified rules engine.

Figure 3:
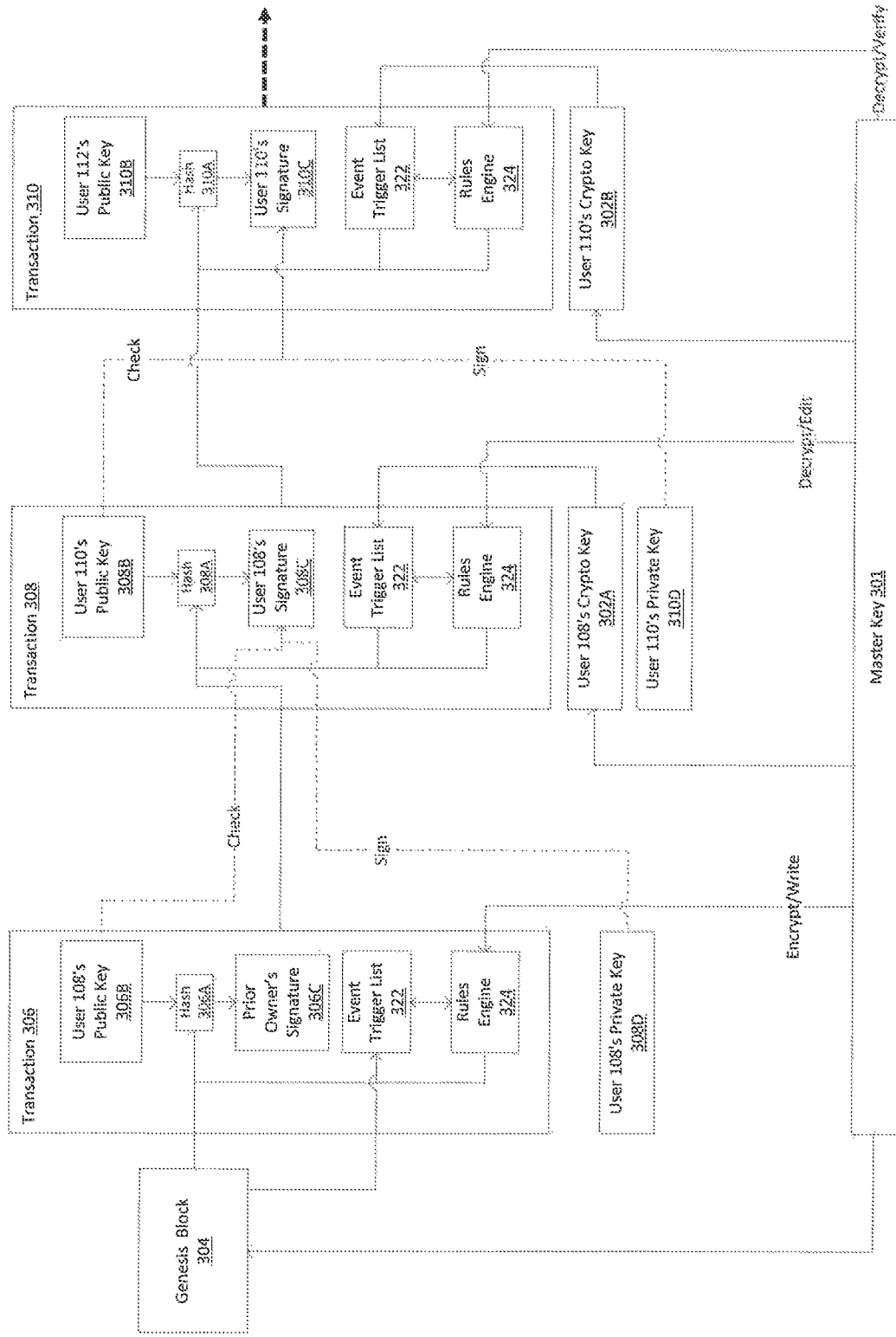
FIG. 3 is a schematic diagram illustrating a hybrid, public-private blockchain ledger architecture, consistent with disclosed embodiments.

FIG. 3 is a schematic diagram of illustrating an exemplary structure 300 of a hybrid, public-private blockchain ledger, which may be generated through the interaction of components of computing environment 100, in accordance with the disclosed embodiments. For example, as described in reference to FIG. 3, users 108, 110, and 112 may be associated with corresponding devices (e.g., client devices 102, 104, and 106), which may be configured to execute one or more stored software applications (e.g., a wallet application) capable of obtaining a current version of a hybrid blockchain ledger from one or more networked computer systems (e.g., one of peer systems 160 configured to "mine" broadcast transactions and update ledgers).

Further, in some aspects, and as described above, a system associated with a rules authority (e.g., system 140 associated with business entity 150) may generate a rules engine that regulate transactions involving the assets tracked by the hybrid blockchain ledger (e.g., distributions, transfers of ownership, other actions, etc.), and further, a list of triggering events that, upon detection by system 140, trigger an initiation of one or more of the distributions, transfers, and/or other actions regulated by the generated rules engine. In additional aspects, and as described above, system 140 may generate a master encryption key (e.g., master key 301 of FIG. 3), and may generate additional private "crypto" keys 302A and 302B, which may be associated with corresponding ones of users 108 and 110. In some aspects, system 140 may maintain master key 301 and/or private crypto keys 302A, 302B, and 302C in a portion of data repository 144, and may provide private crypto keys 302A, 302B, and 302C to users 108, 110, and 112 through secure, out-of-band communications. System 140 may, in additional aspects, encrypt the generated rules engine and the generated list of triggering events, and further, perform operations that hash the encrypted rules engine and list of triggering events into a genesis block of the hybrid blockchain ledger (e.g., genesis block 304).

In an embodiment, one of the users (e.g., user 108) may own and/or control a portion of the tracked assets. For example, a device associated with user 108 (e.g., client device 102) may execute a stored software application (e.g., a wallet application) capable of obtaining a current version of a hybrid blockchain ledger, including genesis block 304, from one or more networked computer systems (e.g., one of peer systems 160 configured to "mine" broadcast transactions and update ledgers). In some aspects, the current version of a hybrid blockchain ledger may represent a "longest" blockchain ledger that includes a maximum number of discrete "blocks," which may identify transactions that transfer, distribute, etc., portions of tracked assets among various owners, including user 108.

For example, client device 102 may obtain the current hybrid blockchain ledger, and may process the hybrid blockchain ledger to determine that a prior owner transferred ownership of a portion of the tracked assets to user 108 in a corresponding transaction (e.g., transaction 306, schematically illustrated in FIG. 3). As described above, one or more of peer systems 160 may have previously verified, processed, and packed the data associated with transaction 306 into a corresponding block of the conventional blockchain using any of the exemplary techniques described above and/or apparent to one of ordinary skill in the art.

In some aspects, as illustrated in FIG. 3, data specifying transaction 306 may include input data that references one or more prior transactions (e.g., transactions that transferred ownership of the tracked asset portion to the prior owner), and further, output data that includes instructions for transferring the tracked asset portion to user 108. For example, and as described above, input data consistent with the disclosed embodiments may include, but is not limited to, a cryptographic hash of the one or more prior transactions (e.g., hash 306A), and output data consistent with the disclosed embodiments may include, but is not limited to, a quantity or number of units of the tracked asset portion that are subject to transfer in transaction 306 and a public key 306B of user 108 (i.e., the recipient of the tracked asset portion transferred in transaction 306). Further, in some aspects, the transaction data may include a digital signature 306C of the prior owner, which may be applied to hash 306A and public key 306B using a private key of the prior owner through any of a number of techniques apparent to one of skill in the art and appropriate to the conventional blockchain ledger architecture.

Further, and in contrast to the conventional blockchain ledger architectures described above, transaction 306 may also include encrypted and/or hashed copies of rules engine 324 and event trigger list 322. In certain aspects, a device of the prior owner (e.g., which may execute one or more software applications) may access genesis block 304 (e.g., from the current version of the hybrid blockchain ledger obtained from one or more of peer systems 160), may parse genesis block 306, and may extract copies of the encrypted and/or hashed rules engine 324 and event trigger list 322. The prior owner's device may transmit to one or more of peer systems 160 along with the hash 306A, public key 306B, and digital signature 306C for verification, processing (e.g., additional cryptographic hashing) and inclusion into a new block of the hybrid blockchain ledger.

In an embodiment, user 108 may elect to further transfer that tracked asset portion to an additional user (e.g., user 110). For example, as described above, the one or more software applications executed by client device 102 may cause client device 102 to perform operations that generate input and output data specifying a new transaction (e.g., transaction 308 of FIG. 3) that transfers ownership of the tracked asset portion from user 108 to user 110, and further, that transmit the generated data to one or more of peer systems 160 for verification, processing (e.g., additional cryptographic hashing) and inclusion into a new block of the hybrid blockchain ledger.

For example, data specifying transaction 308 may include, but is not limited to, a cryptographic hash 308A of prior transaction 306, a quantity or number of units of the tracked asset portion that are subject to transfer in transaction 308, and a public key of the recipient (e.g., public key 308B of user 110). Further, in some aspects, the data specifying transaction 308 may include a digital signature 308C of the user 108, which may be applied to hash 308A and public key 308B using a private key 308D of user 108 using any of the exemplary techniques described above. Further, and by way of example, the presence of user 108's public key within transaction data included within the conventional blockchain ledger may enable various devices and systems (e.g., client devices 102, 104, and/or 106, peer systems 160, etc.) to verify the user 108's digital signature 308C, as applied to data specifying transaction 308.

Additionally, and as described above, client device 102 may also parse data specifying prior transaction 306 (e.g., as obtained from the current version of the hybrid blockchain ledger) and extract encrypted and/or hashed copies of rules engine 324 and event trigger list 322. In certain aspects, client device 102 may append the encrypted and/or hashed copies of rules engine 324 and event trigger list 322 to the data specifying transaction 308 (e.g., cryptographic hash 308A, public key 308B, and digital signature 308C), and transmit the data specifying transaction 308 to one or more of peer systems 160 for verification, processing (e.g., additional cryptographic hashing) and inclusion into a new block of the hybrid blockchain ledger.

Further, and as described above, private crypto key 302A may enable client device 102 (e.g., associated with user 108) to access encrypted event trigger list 322 upon extracted from the hybrid blockchain ledger, as described above. In some embodiments, private crypto key 302A may provide client device 102 with read-only access to the encrypted event trigger list 322. In some aspects, client device 102 may obtain private crypto key 302A from system 140 using secured out-of-band communications, and additionally or alternatively, as input provided by user 108 through a web page or other graphical user interface (GUI) presented by client device 104.

In an embodiment, ownership of the tracked asset portion may be transferred from user 108 to user 110 upon verification and publication of the data specifying transaction 308 within a corresponding block of the hybrid blockchain ledger by peer systems 160. In further embodiments, and as described above, user 110 may elect to further transfer that tracked asset portion to yet another user (e.g., user 112). For example, as described above, the one or more software applications executed by client device 104 may cause client device 104 to perform operations that generate input and output data specifying a new transaction (e.g., transaction 310 of FIG. 3) that transfers ownership of the tracked asset portion from user 110 to user 112, and further, that transmit the generated data to one or more of peer systems 160 for verification, processing (e.g., additional cryptographic hashing) and inclusion into a new block of the hybrid blockchain ledger.

For example, data specifying transaction 310 may include, but is not limited to, a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of the user 110, which may be applied to hash 310A and public key 310B using a private key 310D of user 110, as described above. Additionally, and by way of example, the presence of user 110's public key 308B within transaction data included within the hybrid blockchain ledger may enable various devices and systems (e.g., client devices 102, 104, and/or 106, peer systems 160, etc.) to verify the user 110's digital signature 310C, as applied to data specifying transaction 310.

Additionally, and as described above, client device 104 may also parse data specifying prior transaction 308 (e.g., as obtained from the current version of the hybrid blockchain ledger) and extract encrypted and/or hashed copies of rules engine 324 and event trigger list 322. In certain aspects, client device 104 may append the encrypted and/or hashed copies of rules engine 324 and event trigger list 322 to the data specifying transaction 310 (e.g., cryptographic hash 310A, public key 310B, and digital signature 310C), and transmit the data specifying transaction 310 to one or more of peer systems 160 for verification, processing (e.g., additional cryptographic hashing) and inclusion into a new block of the hybrid blockchain ledger. In an embodiment, ownership of the tracked asset portion may be transferred from user 110 to user 112 upon verification and publication of the data specifying transaction 310 within a corresponding block of the hybrid blockchain ledger by peer systems 160. Further, and as described above, private crypto key 302B may enable client device 104 (e.g., associated with user 110) to decrypt event trigger list 322 upon extraction from the hybrid blockchain ledger, as described above. In some aspects, client device 104 may obtain private crypto key 302B from system 140 using secured out-of-band communications, and additionally or alternatively, as input provided by user 110 through a web page or other graphical user interface (GUI) presented by client device 104. In other aspects, client device 104 may identify and extract private crypto key 302B from a portion of the hybrid blockchain ledger obtained from peer systems 160 (e.g., as a secure in-band communication).

In the embodiments described above, system 140 may establish and maintain rules (e.g., through a rules engine and corresponding list of triggering events) that facilitate regulatory-based, policy-based, and customer-specified controls of transactions involving assets tracked within a hybrid blockchain ledger. For example, client devices 102, 104, and/or 106 may generate transaction data that includes rules engine and list of triggering events, and one or more of peer systems 160 may embed the generated transaction data into blocks of the hybrid blockchain ledger for reference in subsequent transactions. Further, in certain aspects, system 140 may be configured to detect an occurrence of an event (e.g., based on data received from client devices 102, 104, and/or 106, etc.), may determine whether the list of triggering events includes the detected event, and when triggering event list includes the detected event, perform one or more operations consistent with an established rule that references the detected event, as described below in reference to FIG. 4.

Figure 4:
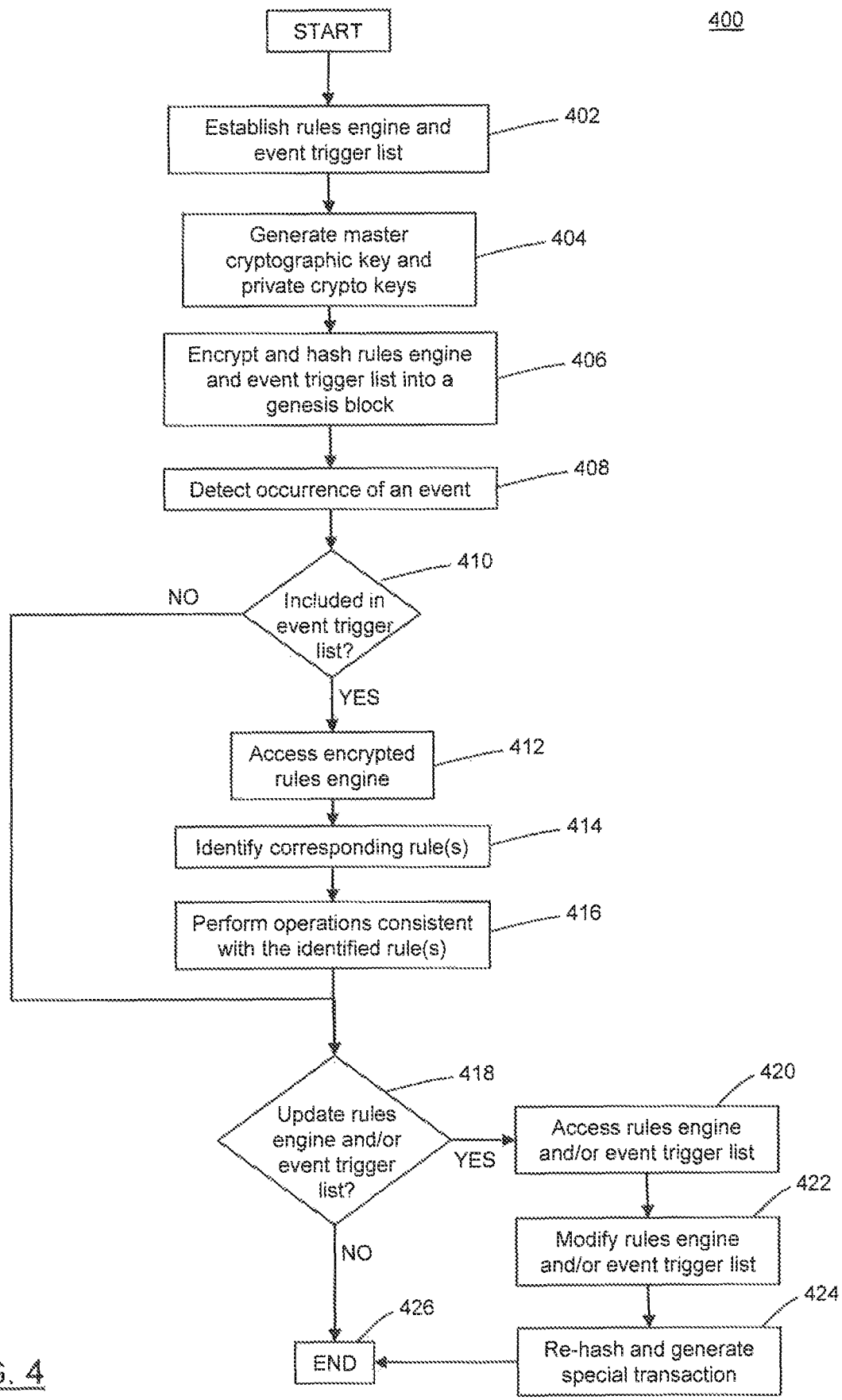
FIG. 4 is a flowchart of an exemplary process for performing event-based operations on assets tracked within a hybrid blockchain ledger, consistent with the disclosed embodiments.

FIG. 4 is a flowchart of an exemplary process 400 for automatically performing event-based operations on assets tracked within a hybrid blockchain ledger in accordance with disclosed embodiments. In an embodiment, a rules authority may be assigned to establish regulatory-based, policy-based, and customer-specified control over assets tracked within the hybrid blockchain ledger. In some aspects, tracked assets consistent with the disclosed embodiments may include, but are not limited to, units of a virtual currency or a crypto-currency, units of financial instruments held by one or more owners, and physical assets utilized by one or more individuals and/or entities. In some aspects, a computer system associated with the rules authority (e.g., system 140 associated with business entity 150) may execute one more stored application programs to cause system 140 to recover, authorize, audit, and/or verify an ownership of at least a portion of the tracked assets and/or transactions involving the tracked assets based on established and maintained rules.

In one aspect, one or more computing components of system 140 may generate a rules engine and a list of triggering events, which may be stored within a portion of data repository 144 (e.g., in step 402). For example, the generated and stored rules engine may identify one or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.). Further, and as described above, the generated and stored list of triggering events may include information that specifies causal relationships between one or more of the established rules and one or more events that trigger an initiation of one or more corresponding regulated distributions, transfers, and/or actions involving assets tracked within the hybrid public-private ledger (e.g., the triggering events).

In certain instances, system 140 may establish, in step 402, one or more of the rules and/or triggering events to reflect regulations and/or policies promulgated by governmental entity, a financial regulator, and/or the rules authority. For example, system 140 may establish a loss of a private key by user 110 as a "triggering event" that would cause system 140 to perform operations that generate a new pair of public and private blockchain keys for user 110 in response to a verification of particular authentication credentials. Further, and by way of example, system 140 may deem a documented theft of a portion of the tracked assets a "triggering event" that would cause system 140 to perform operations recover the stolen portion of the tracked assets and generate a new pair of public and private blockchain keys for user 110.

In other instances, system 140 may establish, in step 402, one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, etc.) in response to an accident involving user 110 and/or user 110's death (e.g., triggering events). The disclosed embodiments are, however, not limited to these exemplary triggering events and corresponding rules, and in further embodiments, system 140 may establish any additional or alternate rules and/or triggering events appropriate to the tracked assets, to business entity 150, and further, to users 108, 110, and 112.

Further, one or more computing components of system 140 may generate additional cryptographic keys that facilitate the exemplary regulation of transactions (e.g., distributions, transfers, and/or actions) involving assets tracked within the hybrid public-private ledger (e.g., in step 404). By way of example, in step 404, system 140 may generate a master cryptographic key with which system 140 may encrypt the generated and stored rules engine, as described above. In some aspects, system 140 may store copies of the generated master key in a portion of data repository 144 that is not accessible to user 110 (and any other users), thus maintaining a confidence of the generated master key.

Further, in step 404, system 140 may also perform operations that generate and maintain additional private cryptographic keys (e.g., private "crypto" keys) associated with each owner of the assets tracked within the hybrid blockchain ledger. As described above, the generated private crypto keys may enable a device of each owner to decrypt and access the list of triggering events and additionally or alternatively, metadata identifying the rules authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

In step 406, system 140 may perform operations that encrypt the generated and stored rules engine (e.g., using the master encryption key) and further, that encrypt the generated and stored list of triggering events (e.g., using any of the exemplary techniques described above that facilitate decryption using the private crypto keys). For example, system 140 may perform operations in step 406 that hash the encrypted rules engine and list of triggering events into a genesis block of the hybrid blockchain ledger, the contents of which may be incorporated (e.g., by client devices 102, 104, and/or 106, peer systems 160, etc.) into each of the subsequent transaction blocks generated and appended to the hybrid blockchain ledger. In some aspects, by incorporating the hashed and encrypted rules engine and list of triggering events into the blocks of the hybrid blockchain ledger, the disclosed embodiments may ensure that the established rules are followed even in an event of actions by malicious parties that disrupt the tracked assets (e.g., instances of Bitcoin™ peeling, etc.).

Further, in some embodiments, one or more computing components of system 140 may detect an occurrence of an event involving a portion of the tracked assets, an owner of a portion of the tracked assets, and/or a transaction involving a portion of the detected assets (e.g., in step 408). For example, system 140 may receive data from client device 104 that indicates user 110 lost a corresponding private blockchain key associated with a portion of the tracked assets. In other instances, system 140 may detect an event in step 408 based on data received across network 120 from one or more systems associated with local, state, and/or federal governmental entities (e.g., data from a law enforcement system notifying business entity 150 of a theft of a portion of the tracked assets, data from a local government confirming a death of an owner of a portion of the tracked assets, etc.). Further, in additional instances, system 140 may detect an occurrence of an event based on one or more sensors and devices communicatively connected to network 120 and capable of transmitting data to system 140. The disclosed embodiments are, however, not limited to these exemplary events, and in further embodiments, system 140 may be configured to detect any additional or alternate event appropriate to the tracked assets and to the components of computing environment 100.

System 140 may also be configured to access the stored list of triggering events (e.g., within database 144), and may determine whether the list of triggering events includes the detected event (e.g., in step 410). If system 140 were to identify the detected event within the list of triggering events (e.g., step 410; YES), system 140 may establish the detected event as a triggering event, and may access the encrypted rules engine using the master encryption key (e.g., in step 412). System 140 may further identify, within the accessed rules engine, one or more of the established rules that are causally related to the detected triggering event (e.g., in step 414). Further, in some aspects, system 140 may be configured to perform one or more operations, either individually or in sequence, that are consistent with the identified rules (e.g., in step 416). For example, the accessed rules engine may include information identifying the one or more operations associated with the identified rules. In other instances, at least one of the performed operations may represent a default operation associated with the identified rules (e.g., a specific type of authentication required before performing the one or more operations on behalf of user 110).

In one embodiment, one or more computing components of system 140 may also determine whether to update portions of the generated rules engine and/or list of triggering events (e.g., in step 418). For example, system 140 may identify an update or modification to one or more regulations and/or policies promulgated by governmental entity, a financial regulator, and/or the rules authority. In other instances, system 140 may obtain, from client device 104, information updating a rule and/or triggering event previously established by system 140 based on input received from user 110 (e.g., through a web page and/or GUI presented by client device 104).

If system 140 determines to update portions of the generated rules engine and/or list of triggering events (e.g., step 418; YES), system 140 may access appropriate portions of the rules engine and/or list or triggering events in step 420 (e.g., using the master encryption key and/or any of the exemplary techniques described above), and may modify the appropriate portions of the rules engine and/or list of triggering events to reflect the updated regulations, policies, user-specified rules, and/or user-specified events (e.g., in step 422). In some instances, system 140 may modify the accessed rules engine by adding a new rule, deleting an existing rule, modifying one or more parameters of an existing rule, and/or modifying one or more operations associated with an existing rule. In other instances, system 140 may modify the accessed list of event triggers to add a new triggering event, delete an existing triggering event, and/or add or modify parameters associated with an existing triggering event.

In some aspects, system 140 may encrypt and re-hash the modified rules engine and/or list of triggering events, and may submit the encrypted and hashed modified rules engine and/or list of triggering events to one or more of peer systems 160 for inclusion in a block of the hybrid blockchain ledger (e.g., in step 424). For example, one or more of peer systems 160 may incorporate the hashed and encrypted modified rules engine and/or list of triggering events into the hybrid blockchain ledger as a special transaction (e.g., a "0" value transaction), such that the hybrid blockchain ledger tracks each change within the modified rules engine and/or list of triggering events. Exemplary process 400 is then complete in step 426.

Referring back to step 418, if system 140 were to determine that no modification to the rules engine and/or the list of triggering events is warranted (e.g., step 418; NO), exemplary process 400 may pass forward to step 426, and exemplary process 400 is complete. Further, and in reference to step 410, if system 140 were to determine that the list of triggering events fails to include the detected event (e.g., step 410; NO), exemplary process 400 may pass forward to step 418, and system 140 may determine whether to update portions of the rules engine and/or list of triggering events using any of the exemplary processes described above.

In the embodiments described above, and through the generation of the master cryptographic key and management of the generated rules engine and corresponding list of triggering events, system 140 may perform operations that recover, authorize, audit, and/or verify an ownership of at least a portion of the tracked assets and/or transactions involving the tracked assets. In certain aspects, the operations performed by system 140, which utilize hybrid blockchain ledgers consistent with the disclosed embodiments, would not be possible using the conventional blockchain ledgers described above.

For example, user 110 may be an avid user of a virtual or crypto-currency (e.g., Bitcoin™), user 110 may store a private key (e.g., private key 310D) on a laptop computer (e.g., client device 104) to generate and confirm Bitcoin™ transactions. In one instance, user 110 may unfortunately drop the laptop into a swimming pool while confirming a Bitcoin™ with private key 310D, and upon retrieved from the swimming pool, user 110 may establish that the laptop no longer functions and that data on the laptop is not recoverable.

Through a device in communication with network 120 (e.g., user 110's smartphone), user 110 may access a conventional blockchain ledger, such as those conventional architectures outlined above, and determine that the Bitcoin™ transfer was incomplete when user 110 dropped the laptop into the swimming pool. Further, user 110 may determine that the Bitcoin™ transaction represents an orphaned block within the conventional blockchain ledger, and the Bitcoins™ associated with the orphaned block are unrecoverable and permanently lost.

In other aspects, user 110 may access a hybrid blockchain ledger (e.g., as described above in reference to FIG. 3), and may determine that the Bitcoin™ transfer was incomplete when user 110 dropped the laptop into the swimming pool. In an embodiment, however, user 110 may provide input to the smartphone identifying the unrecoverable private key, which the smartphone may transmit to system 140 across network 120. In some aspects, system 140 may receive the transmitted message (e.g., in step 408), may determine that user 110's loss of private key 310D represents a triggering event (e.g., step 410; YES), and may perform operations that authenticate user 110's identity and that regenerate a pair of private and public blockchain keys for user 110, which system 140 may transmit to user 110 through any of the secure non-accessible processes outlined above (e.g., in steps 412, 414, and 416). Upon receipt of the newly generated private key, user 110 may access the hybrid blockchain ledger (e.g., through the smartphone) and confirm the Bitcoin™ transfer to recover the crypto-currency.

Further, and by way of example, user 110 may access a wallet application executed by client device 104, and further, may determine that the mobile wallet is missing a number Bitcoins™. User 110 may suspect that the loss of the Bitcoins™ represents a theft by a malicious entity, and through a complex search of a corresponding blockchain ledger (e.g., conventional blockchain ledgers described above, and/or hybrid blockchain ledgers consistent with the disclosed embodiments), user 110 may trace the theft of the Bitcoins™ to a single transaction within a corresponding block. User 110 may contact the police e-crime unit and report the theft, and the police may confirm the accuracy of user 110's allegations regarding the theft.

User 110 may, in some instances, be capable of processing the conventional blockchain ledgers described above to determine an address of the malicious entity responsible for the theft. The decentralized and anonymous nature of conventional blockchain ledgers may, however, prevent user 110 from identifying the malicious entity, and the stolen Bitcoins™ may remain permanently unrecoverable.

The disclosed embodiments may, however, address the deficiencies of conventional blockchain ledgers and provide user 110 with recourse to recover the stolen Bitcoins™. For example, the police e-crime unit may notify the rules authority of the theft of user 110's Bitcoins™ and destination address associated with the malicious entity (e.g., through a message transmitted to system 140 and received, e.g., in step 408). System 140 may determine that the theft of the Bitcoins™ represents a triggering event included within the generated list (e.g., step 410; YES), and may perform operations that automatically create a request for a new transaction that returns the stolen Bitcoins™ to user 110 using any of the exemplary techniques described above (e.g., in steps 412, 414, and 416). System 140 may also perform operations that regenerate a pair of private and public blockchain keys for user 110, which system 140 may transmit to user 110 through any of the secure non-accessible processes outlined above (e.g., in steps 412, 414, and 416).

The hybrid blockchain ledger architectures described above may add a level of sophistication to conventional mechanisms for trustless communication by allowing transactions involving tracked assets to occur according to common transaction rules. Further, the hybrid blockchain ledger architectures consistent with the disclosed embodiments may allow owners of the tracked assets to project authority over the tracked assets by establishing customized rules for transaction authorization. Furthermore, and in contrast to the conventional techniques described above, the hybrid blockchain ledger architecture may enable a rules authority (e.g., business entity 150 associated with system 140) to recover, authorize, audit, and/or verify an ownership of at least a portion of the tracked assets and/or transactions involving the tracked assets based on established and maintained rules.

In the embodiments described above, and through the generation of a master cryptographic key and management of a generated rules engine and corresponding list of triggering events, system 140, acting as a rules authority, may perform operations that recover, authorize, audit, and/or verify an ownership of at least a portion of the tracked assets and/or transactions involving the tracked assets. In some aspects, and as outlined above, tracked assets consistent with the disclosed embodiments may include, but are not limited to, units of a virtual currency or a crypto-currency, units of financial instruments held by one or more owners, and physical assets utilized by one or more individuals and/or entities.

In additional aspects, the exemplary hybrid blockchain algorithms described above may track a location, performance, usage, and/or status one or more additional client devices (e.g., "connected devices") disposed within computing environment 100 (not shown in FIG. 1), which may be configured to establish communications with client devices 102, 104, and 106, and further, with system 140, using any of the communications protocols outlined above. For example, client device 102, 104, and 106, system 140, and the connected devices may be uniquely identifiable and addressable within communications network 120, and may be capable of transmitting and/or receiving data across the established communications sessions. Further, in some aspects, system 140 may be configured to establish the communications sessions with one or more of the connected devices, and to exchange data with the connected devices autonomously and without input or intervention from a user of client device 104 (e.g., user 110).

In some aspects, the connected devices may be implemented as a processor-based and/or computer-based device that includes one or more processors and tangible, computer-readable memories, as described above in reference to client devices 102, 104, and 106. By way of example, connected devices consistent with the disclosed embodiments may include, but are not limited to mobile communications devices (e.g., mobile telephones, smart phones, tablet computers, etc.) and other devices capable of communicating with client device 104 (e.g., internet-ready televisions, internet-ready appliances and lighting fixtures, computing devices disposed within motor vehicles, etc.).

Further, in additional aspects, the connected devices may include sensor devices in communication with the one or more processors and the memories. The sensor devices may, in some aspects, be configured to monitor the usage, location, status, etc., of corresponding ones of the connected devices, and may be configured to provide sensor data to corresponding ones of the processors. In some aspects, the sensor data may include, but is not limited to, data identifying a current state, data specifying intended and/or unintended interaction with one or more of users 108, 110, and/or 112 (e.g., through client devices 102, 104, and/or 106), inadvertent interactions (e.g., drops, other accidental interactions, etc.), and data describing any additional or alternate characteristics of the connected devices capable of being monitored and quantified by the sensor devices.

In other aspects, computing environment 100 may include one or more additional computing systems in communication with the connected devices using any of the communications protocols outlined above. The additional computing system may, in an embodiments, include one or more sensor devices capable of monitoring a location, performance, usage, and/or status of the connected devices, which may establish a "sensor network" capable of monitoring the connected devices. These additional computing systems may provide the additional sensor data to the connected devices using any of the communications protocols outlined above, either at regular intervals or in response to requests from the connected devices. In some instances, the additional computing systems may be implemented as processor-based and/or computer-based systems consistent with the exemplary systems described above.

In further aspects, the connected devices may be configured to transmit portions of the sensor data (e.g., as detected by on-board sensor devices and/or received from the sensor network) to client devices 102, 104, and/or 106 and additionally or alternatively, to system 140, using any of the communications protocols outlined above. By way of example, the sensor data may characterize an interaction between the connected devices and users 108, 110, and 112 (e.g., the monitored data may represent usage data indicative of a consumption of one or more services provided by the connected devices), and the connected devices may transmit the usage data for users 108, 110, and/or 112 to corresponding ones of client devices 102, 104, and/or 106, which may store the received usage data in a corresponding data repository. In further aspects, the connected devices may also transmit the usage data to system 140, along with information linking specific elements of the usage data to corresponding users and/or client devices (e.g., user 110's usage data may be linked to an identifier of user 110 and/or of client device 104). In certain aspects, client devices 102, 104, and/or 106 may also incorporate corresponding portions of the monitored data, e.g., as received from the connected devices, into hybrid blockchain ledgers consistent with the disclosed embodiments in order to record, track, and publicly monitor the location, performance, usage, and/or status of the connected devices.

III. Exemplary Processes for Disbursement Tracking and Control Using Hybrid Private-Public Ledgers In various embodiments described above, computer systems of rules authority (e.g., a financial institution, etc.) augment conventional, decentralized blockchain ledger architectures by selectively encrypting ledger data to protect both a privacy of owners of tracked assets and a confidentiality of existing instruction sets maintained within the blockchain ledger. Further, by incorporating an encrypted rules engine and corresponding list of triggering events (e.g., an event trigger list) into each block of the conventional blockchain ledger architectures (and thus generating a hybrid, public-private blockchain ledger architecture), computer-implemented systems and methods consistent with the disclosed embodiments may perform operations that, for example, provide owners or holders of tracked assets with recovery options in an event of fraud or malicious activity, while maintaining the public availability and verification characteristic of conventional blockchain ledgers.

Further, and consistent with the disclosed embodiments, client devices 102, 104, and/or 106 may execute stored software applications (e.g., mobile applications provided by the rules authority), which may cause client devices 102, 104, and/or 106 to transmit data identifying transactions involving held assets to one or more computer systems across network 120 (e.g., one or more of peer systems 160). As described above, peer systems 160 may act as "miners" for hybrid blockchain ledgers consistent with the disclosed embodiments, and may competitively process the received transaction data (either alone or in conjunction with other data) to generate additional ledger blocks, which may be appended to the hybrid blockchain ledgers and distributed across peer systems 160 (e.g., through a peer-to-peer network) and to other connected devices of environment 100 (e.g., across network 120).

In certain aspects, and as described above, user 108 may transfer funds to user 110 in exchange for one or more goods available for sale, and additionally or alternatively, one or more services performed by user 108 and/or a business entity represented by user 108. In other instances, however, user 108 may transfer the funds to user 110 with an intention that user 110 access and utilize the funds for a specific purposes and/or for purchase involving specific goods. For example, the transferred funds may represent, among other things, an earmarked donation facilitating a purchase of one or more holiday gifts, a mandated payment supporting a spouse and/or one or more children, funds provisioning a child's allowance, a grant from a governmental entity to repair a storm-damaged hole or to replace drought-stricken crops, and/or funds to perform services for one or more additional parties on behalf of user 110 (e.g., care of user 108's elderly parent, maintained on residence of user 108's parents, etc.). Although conventional blockchain ledger architectures (e.g., as described above in reference to FIG. 2) may include ledger blocks that track user 110's spending of the transferred funds, these conventional techniques may be incapable of enforcing a restriction imposed by user 108 on user 110's use of the transferred funds. Indeed, using these conventional techniques, user 108 often must rely on user 108's assurances that the transferred funds will be spend in conformance with user 108's intentions, and may detect a non-conforming use of the transferred funds after execution of a corresponding transaction by user 110.

The disclosed embodiments may, in certain aspects, enable customers of a financial institution to establish and enforce one or more usage restrictions on funds transferred between parties using the exemplary hybrid, blockchain ledger data structures described above. In some aspects, and consistent with the disclosed embodiments, the customers of the financial institution, through software applications executed by corresponding devices, may specify the one or more usage restrictions concurrently with the specification of the transferred funds and the recipient of the transfer, along with one or more conditional actions taken by the financial institution in response to a detection of a non-conforming financial transaction involving the transferred funds. Additionally, a computer system maintained by the financial institution may, in certain aspects, associate the usage restrictions and/or conditional actions with a transaction involving the transferred funds, and may incorporate portions of the usage restrictions and/or conditional actions within a corresponding rules engine hashed into each block of the exemplary hybrid, blockchain ledger data structures described above. By incorporating the usage restrictions and/or conditional actions into the rules engines hashed into the hybrid, blockchain ledger data structures, the disclosed embodiments may provide a centralized, publicly accessible mechanism that tracks a recipient's use of transferred funds in real time, and prevents, flags, and/or notifies the entity that transferred the funds of a non-conforming transaction prior to completion of that transaction.

For example, user 108's parents may reside within a foreign country on limited incomes, e.g., derived from one or more pensions and governmental assistance programs. After a recently conversation, user 108 may determine that a family home is in need of significant repair, and that user 108's parents may be unable to easily afford the necessary repairs. User 108 may identify a reputable contractor capable of performing the necessary repairs, and user 108 and the contractor may agree on total cost for the repairs (e.g., $10,000), a portion of which may be paid upon initiation of the project (e.g., $3,000 to fund a purchase of materials), with the balance being paid upon completion. Rather than provide the funds directly to the parents (e.g., the provided funds may trigger pension adjustments and/or the parents may be unfamiliar with tendering process), or travel to pay the contractor in person, user 108 may elect to transfer the necessary funds to initiate and complete the project to a family friend (e.g., user 110), who may agree to act on user 108's behalf and pay the contractor the appointed fee prior to initiation and upon completion.

In some aspects, however, user 108 may have concerns that user 110 may use the transferred funds for inappropriate purposes. For example, user 108 may suspect that user 110 may, upon receipt of the funds, locate a less-reputable contractor willing to complete the project for less than the agreed-upon $10,000 payment. In some instances, user 110 may provide a portion of the transferred funds to the less-reputable contractor, and that keep a remaining portion of the transferred funds for personal use. As described above, conventional blockchain ledgers may at most provide a post-transaction tracking mechanism capable of alerting user 108 to any inappropriate use of the transferred funds only upon completion of one or more corresponding transactions (e.g., upon verification and incorporation into new ledger blocks by peer systems 160). In other aspects, however, one or more of the exemplary hybrid blockchain ledger architectures described above may provide a centralized and transparent mechanism that enables user 108 to establish one or more restrictions on user 110's use of the transferred, and further, that enables a financial institution to actively monitor user 110's use of the transferred funds, to identify potential non-conforming transactions prior to execution, and to perform operations that block and/or flag the non-conforming transaction in accordance with rules specified by user 108.

By way of example, a device of user 108 (e.g., client device 102) may execute one or more software applications (e.g., a web browser and/or mobile wallet application) that enable user 108 to initiate a transfer of units of a virtual currency (e.g., Bitcoin™) to a mobile wallet or other appropriate account associated with or maintained on behalf of user 110 (e.g., a mobile wallet established by a corresponding application executed by client device 104). In some aspects, client device 102 may present, to user 108, a web page and/or other graphical user interface (GUI) associated with a financial institution, into which user 108 may provide input specifying one or more terms of the transfer (e.g., an amount of funds, a transfer date) and information identifying a recipient of the transfer (e.g., user 110's name, a user name or handle of user 110, an email address and/or IP address associated with user 110 and/or client device 104, etc.). The disclosed embodiments are, however, not limited to these exemplary transfer parameters, and in additional embodiments, user 108 may provide as input any additional or alternate data that would facilitate the desired transfer of the virtual currency units and would be appropriate to the virtual currency, the financial institution, and the applications executed by client device 102.

In further aspects, and in addition to the transfer parameters, user 108 may provide additional input data indicative of one or more restrictions on user 110's use of the transferred funds. By way of example, user 108 may provide input limiting user 110's use of the transferred funds to transactions involving the reputable contractor and specific portions of the transferred funds (e.g., a $3,000 initial portion and a $7,000 balance). In some aspects, to establish the limitations, user 108 may provide input to client device 102 that identifies the reputable contractor as a permissible transaction partner for user 110 (e.g., by specifying information identifying the reputable contractor, such as a username, an email address, and IP address, etc.) and that identifies the permissible transaction parameters (e.g., amounts). The disclosed embodiments are, however, not limited to these exemplary limitations and corresponding input, and in additional embodiments, user 108 may provide input establishing any additional or alternate restriction on user 110's use of the transferred funds that would be appropriate to the financial institution, the funds themselves (e.g., the virtual currency), and client device 102.

Further, in certain aspects, user 108 may also input data to client device 102 (e.g., as input to the web page and/or presented GUI) that specifies one or more conditional actions to be implemented by computer systems of the financial institution upon detection of a transaction initiated by user 110 that does not conform with the one or more identified restrictions (e.g., a "non-conforming" transaction). By way of example, conditional actions consistent with the disclosed embodiments may include, but are not limited to, a refusal to execute non-conforming transaction, a suspension of a non-conforming transaction pending notification and additional actions by user 110 (e.g., in response to a presentation of the notification by client device 102), an execution of a non-conforming transaction by when corresponding transaction parameters that fall within user-specific limits (e.g., transaction having values that fall below a user-specific threshold of $5.00), and/or processes that flag a non-conforming transaction, store data indicative of the various parameters of the flagged non-conforming transaction (e.g., in data repository 144), and permit execution of the flagged transaction. The disclosed embodiments are not limited to these exemplary conditional actions, and in further embodiments, user 108 may provide input specifying any additional or alternate conditional action appropriate to the identified limitations and/or restrictions and consistent with one or more policies of the financial institution.

Further, in some instances, user 108 may provide textual input to client device 102 specifying the one or more restrictions, limitations, and corresponding conditional actions (e.g., as input to a text box presented within the web page and/or GUI). In other aspects, and consistent with the disclosed embodiments, the web page and/or GUI may include one or more selectable menus (e.g., drop-down menus) that, in conjunction with provided text, enable user 108 to provide input to client device 102 specifying the one or more restrictions, limitations, and corresponding conditional actions.

In certain aspects, client device 104 may process and package the input data (e.g., the input data identifying parameters of the transaction, the imposed restrictions, and the specified conditional actions), and transmit portions of packaged data to system 140, which may enforce the imposed restrictions on any subsequent use by user 110 of the funds transferred by user 110, and further, which may perform one or more of the specified conditional actions in response to user 110's attempted use of the transferred funds in a non-conforming transaction, as described below. In certain aspects, system 140 may store portions of the packaged data that identify users 108 and 110, the transaction transferring funds (e.g., unit of the virtual currency), the imposed restrictions, and/or the specified conditional actions within a locally accessible data repository (e.g., data repository 144) or within a secure, network-accessible data repository (e.g., a cloud-based data repository).

Further, and by way of example, system 140 may access an encrypted list of event triggers (e.g., event triggers list 322) and an encrypted rules engine (e.g., rules engine 324), which system 140 may decrypt using any of the exemplary techniques described above. System 140 may, in certain aspects, modify portions of the decrypted list of event triggers to incorporate data identifying the restrictions imposed by user 108 on user 110's use of the transferred funds in subsequent transactions. For example, system 140 may augment portions of the accessed list of event triggers to identify a permissible transaction type (e.g., an additional transfer of the virtual currency to a permissible transaction partner in accordance with permissible transaction terms), the permissible transaction partner (e.g., data identifying the reputable contractor, such as an email address, IP address etc.), and one or more of the permissible transaction parameters (e.g., permissible transaction amount, such as the $3,000 initial payment and/or the $7,000 balance). In some aspects, system 140 may encrypt the augment list of event triggers using any of the exemplary techniques described above, and may store the encrypted copy of the augment list of event triggers in a locally accessible data repository (e.g., data repository 144).

In additional aspects, system 140 may modify portions of the decrypted rules engine to incorporate the specified conditional actions, which system 140 may perform in response to a detection of a non-conforming transaction initiated by user 110. For example, system 140 may include, within the decrypted rules engine data, conditional actions that include, but are not limited to, processes that refusal a non-conforming transaction, that suspend execution of a non-conforming transaction pending receipt of additional input, that permit execution of a non-confirming transaction when one or more transaction parameters fall within user-specified threshold limits, and additionally or alternatively, that flag a non-conforming transaction prior to permitting execution of the flagged non-conforming transaction. In certain aspects, system 140 may also generate data associating the specified conditional rules with one or more non-conforming transaction (e.g., transactions that fail to involve the permissible transaction type, the permissible transaction partner, and/or the permissible transaction parameter), which may be incorporated into the decrypted rules engine data. System 140 may encrypt the modified rules engine data using any of the exemplary techniques described above, and may store to encrypted modified rules engine data in a locally accessible data repository (e.g., data repository 144).

In some aspects, as described above, system 140 may transmit portions of the data identifying the transaction transferring funds between users 108 and 110 (e.g., identifiers of users 108 and 110, identifiers of client devices 102 and 104, units of currency transferred, a timestamp, etc.) to one or more of peer systems 160, along with the encrypted and modified list of event triggers and rules engine. In other aspects, client device 102 may transmit portions of the packaged transaction data directly to one or more of peer systems 160, e.g., as an alternate to or in addition to the transmission of the packaged input data to system 140. Peer systems 160 may, using any of the exemplary techniques described above, competitively process the received transaction data, the encrypted rules engine, and the encrypted list of event triggers to generate one or more new ledger blocks of a hybrid, blockchain ledger data structure that verifies and establishes the transaction transferring funds between users 108 and 110, publicly records the restrictions imposed by user 108 on user 110's future use of the transferred funds, and further, establishes one or more conditional actions that system 140 (and/or other systems acting as a rules authority for the hybrid, blockchain ledger) may perform in response to an initiation of a non-conforming transaction by user 110.

For example, as described above, one or more of peer systems 160 may act as "miners" for the asset-specific, hybrid, blockchain ledger, and may competitively process the packaged data (either alone or in conjunction with other data) to generate the one or more new ledger blocks, which may be appended to a latest, longest version of the hybrid blockchain ledger to record and verify the transaction between users 108 and 110. Additionally, and as described above, peer systems 160 may hash into the one or more new blocks the encrypted list of triggering events (e.g., event trigger list 322) and the encrypted rules engine (e.g., rules engine 324). In certain aspects, the encrypted list of triggering events may be accessible to the transaction partners (e.g., using a corresponding private crypto key, such as crypto keys 302A and 302B described above), each of the transaction partners (e.g., user 108 and 110) may access and view the one or more restrictions imposed by user 110 on user 110's future use of the transferred funds.

By way of example, the new ledger block may encoded using a Base58 encoding scheme (e.g., as employed for blockchain ledgers memorializing transactions involving Bitcoin™ virtual currencies). The disclosed embodiments are, however, not limited to these exemplary encoding schemes, and in further embodiments, peer systems 160 may encode the new ledger block using a human readable crypto-graffiti encoding scheme, which may simplify the blockchain data structure. Further, and by way of example, the new ledger block generated by peer systems 160 may be structure to include, among other things: a block header (which identifies an address of a prior block); an identifier of the corresponding one or peer systems 160 that created the additional ledger block; a rules header that includes a rules associate key (e.g., that associates a rule to the Internet-connected device); an encrypted list of event triggers and an encrypted rules engine; a header for the received transaction data; and the received transaction data written into the hybrid, blockchain data structure, as described above.

In some embodiments, system 140, acting as a rules authority, may execute software applications that enable a first user (e.g., user 108) to earmark funds transferred to a second party (e.g., user 110) for subsequent use in one or more permissible transactions involving permissible parties and/or in accordance with permissible transaction parameters. Further, the exemplary hybrid blockchain ledger data structures described above may record one or more earmarks and restrictions imposed on user 110's subsequent use of the transferred funds (e.g., one or more of the permissible transactions, transaction partners, and/or transaction parameters) in an encrypted list of event triggers, which may accessed by users 108 and 110 (and by other users) through a corresponding private crypto key (e.g., crypto keys 302A and 302B). Thus, through the disclosed embodiments, user 110 may access, view, and understand the earmarks and restrictions imposed by user 108 on subsequent transactions involving the transferred funds, and may be capable of initiating one or more subsequent transactions that conform to the imposed earmarks and restrictions (e.g., one or more "conforming transactions"). Further, and as described below in reference to FIG. 5, system 140 enforce the publicly accessible, imposed restrictions on user 110's activities, and may perform one or more conditional actions (e.g., as included within the encrypted rules engine) upon detection of a subsequent transaction involving the transferred funds that fails to conform to the restrictions imposed by user 108 (e.g., a non-conforming transaction).

Figure 5:
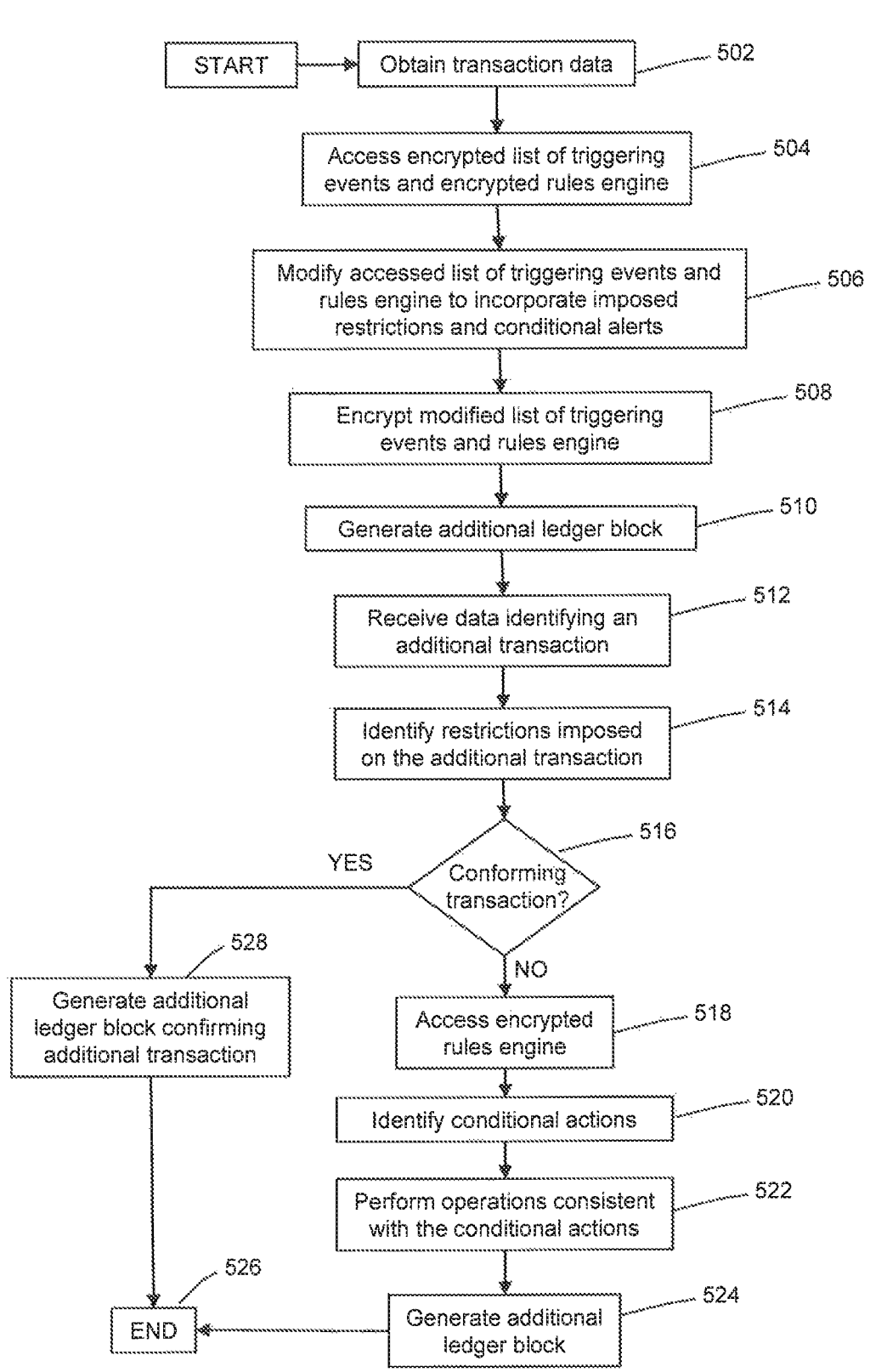
FIG. 5 is a flowchart of an exemplary process for tracking earmarked disbursement using a hybrid blockchain ledger, consistent with the disclosed embodiments.

FIG. 5 is a flowchart of an exemplary process 500 for automatically performing operations establish, maintain, and enforce restrictions on transactions tracked within a hybrid blockchain ledger, in accordance with disclosed embodiments. The disclosed embodiments may, for example, enable a device held by a first party (e.g., client device 102 of user 108) to execute software instructions that initiate a transfer of funds (e.g., units of a virtual currency) to a second party (e.g., user 110). In certain aspects, a computer system associated with a financial institution (e.g., system 140) may, acting as a rules authority for the hybrid blockchain ledger, receive data identifying one or more restrictions on user 110's use of the transferred funds in subsequent transactions, and data specifying one or more conditional actions to be performed by system 140 upon detection of a subsequent transaction that fails to conform to the imposed restrictions.

As described below, system 140 may incorporate the identified restriction into a corresponding encrypted list of event triggers (e.g., event trigger list 322), may incorporate the specified conditional actions into an encrypted rules engine (e.g., rules engine 324), and may transmit the transaction data identifying the transfer, the encrypted list of event triggers, and the encrypted rules engine to one or more mining systems (e.g., peer systems 160), which may generate a new ledger block that records the transfer of funds between users 108 and 110 and includes the encrypted list of triggering events and rules engine. Based on the encrypted triggering events and rules engine hashed into the new ledger block, system 140 may perform operations that enforce the established restrictions on user 110's use of the transferred funds in subsequent transaction.

By way of example, system 140 may obtain data indicative of a transaction involving a transfer of funds (e.g., units of a virtual currency) from user 108 to user 110 (e.g., in step 502). In some instances, system 140 may receive the transaction data from a device associated with user 108 (e.g., client device 102), and as described above, the transaction data may corresponding to portions of data input by user 110 into a web page or other graphical user interface (GUI) associated with the financial institution (e.g., as provided by server 142 of system 140) and presented to user 108 by client device 102. The disclosed embodiments are not limited to these exemplary sources of transaction data, and in other aspects, transaction data consistent with the disclosed embodiments may include portion of data specified by user 108 and entered by a representative of the financial institution into a corresponding device or terminal.

In some aspects, the received transaction data may specify one or more transfer parameters (e.g., an amount of funds, a transfer date), information identifying user 108 (e.g., user 108's full name, a username or handle, an email address, an IP or MAC address of client device 102, etc.) and further, information identifying user 110 (e.g., user 110's full name, a username or handle, an email address, an IP or MAC address of client device 104, etc.). In additional aspects, the transaction data may also include one or more restrictions on user 110's use of the transferred funds in subsequent transactions, and one or more conditional actions to be implemented by system 140 upon detection of a transaction initiated by user 110 that does not conform with the one or more identified restrictions.

The one or more restrictions may, among other things, limit the subsequent transactions to those involving a permissible transaction type, a permissible transaction partner, and/or one or more permissible transaction parameters. By way of example, and as described above, user 108 may elect to transfer virtual currency in an amount equivalent to $10,000 to user 110 to funds repairs on a home of user 108's parents. In some instances, user 108 may provide, as input to a web page or other GUI presented by client device 102, data identifying the permissible transaction type (e.g., the additional transfer of the virtual currency to the permissible transaction partner in accordance with the permissible transaction terms), the permissible transaction partner (e.g., the reputable contractor), and the permissible transaction terms (e.g., a $3,000 initial payment and/or the $7,000 balance). In certain aspects, and as described below, system 140 may establish any subsequent transaction that conforms to these restrictions as a conforming transaction, and may establish any subsequent transaction that fails to conform to these restrictions as a non-conforming transaction.

Further, the one or more conditional actions may include, but are not limited to, processes that refusal a non-conforming transaction, that suspend execution of a non-conforming transaction pending receipt of additional input, that permit execution of a non-confirming transaction when one or more transaction parameters fall within user-specified threshold limits, and additionally or alternatively, that flag a non-conforming transaction prior to permitting execution of the flagged non-conforming transaction. As described above, system 140 may perform operations that implement one or more of the conditional actions in response to an initiation by user 110 of a non-conforming transaction involving portions of the transferred funds.

Using any of the exemplary techniques described above, in step 504, system 140 may access and decrypt an encrypted list of triggering events (e.g., event trigger list 322) and an encrypted rules engine (e.g., rules engine 324). In certain aspects, and as described above, system 140 may access copies of the encrypted list of triggering events and rules engine from a locally accessible data repository (e.g., data repository 144) and additionally or alternatively, from a latest, longest copy of the hybrid blockchain ledger (e.g., as obtained from peer systems 160).

In some aspects, system 140 may modify portions of the decrypted list of triggering events to include the one or more imposed usage restrictions and may modify portions of the decrypted rules engine to include the one or more specified conditional actions (e.g., in step 506). By way of example, and as described above, system 140 may modify portions of the decrypted list of event triggers to identify the permissible transaction type, the permissible transaction partner (e.g., the reputable contractor), and the one or more permissible transaction parameters. Similarly, and as described above, system 140 may modify portions of the decrypted rules engine to incorporate conditional actions that include, but are not limited to, processes that refuse a non-conforming transaction, that suspend execution of a non-conforming transaction pending receipt of additional input, that permit execution of a non-confirming transaction when one or more transaction parameters fall within user-specified threshold limits, and additionally or alternatively, that flag a non-conforming transaction prior to permitting execution of the flagged non-conforming transaction.

In certain aspects, system 140 may execute software applications to encrypt the modified list of event triggers and the modified rules engine using any of the exemplary techniques described above (e.g., in step 508). System 140 may also copies of the encrypted list of event triggers and the encrypted rules engine in a locally accessible data repository (e.g., data repository 144).

System 140 may also perform one or more operations that generate one or more new ledger blocks of the hybrid, blockchain ledger that includes the received transaction data, the encrypted list of triggering events, and the encrypted rules engine (e.g., in step 510). In some aspects, as described above, system 140 may transmit portions of the received transaction data to one or more of peer systems 160, along with the encrypted and modified list of event triggers and rules engine. Peer systems 160 may, in some instances, competitively process the received transaction data, the encrypted list of event triggers, and the encrypted rules engine to generate the one or more new ledger blocks, which may be appended to the hybrid blockchain ledgers and/or side chains and distributed across peer systems 160 (e.g., through a peer-to-peer network) and to other connected devices of environment 100 (e.g., across network 120). In certain aspects, the one or more new ledger blocks may verify and establish the transaction transferring funds between users 108 and 110, publicly record the restrictions imposed by user 108 on user 110's future use of the transferred funds, and further, establish the one or more conditional actions that system 140 (and/or other systems acting as a rules authority for the hybrid, blockchain ledger) may perform in response to an initiation of a non-conforming transaction by user 110.

In certain aspects, the generation of the one or more ledger blocks by peer systems 160, and the inclusion of these one or more new ledger blocks into a latest, longest version of the hybrid, blockchain ledger, may indicate a completion of the transfer of the funds to user 110, and the transferred funds (e.g., virtual currency equivalent to $10,000) may be available to user 110 in accordance with the one or more restrictions imposed by user 108. Further, and as described above, a device of user 110 (e.g., client device 104) may execute software applications that access the latest, longest version of the hybrid blockchain ledger, decrypt the encrypted rules engine using any of the exemplary techniques described above (e.g., using crypt key 302B), and present to user 110 through a corresponding interface data that identifies the one or more restrictions imposed by user 108, which include, but are not limited to, the permissible transaction type, the permissible transaction partner (e.g., the reputable contractor), and the permissible transaction parameters (e.g., (e.g., a $3,000 initial portion and a $7,000 balance).

User 110 may, in some instances, access the imposed restrictions through client device 104, but may elect to initiate an additional transaction that circumvents one or more of the imposed restrictions. For example, user 104 may provide input to a web page or graphical user interface (GUI) presented by client device 104 that identifies terms of a transaction to additionally transfer a portion of the transferred funds to another contractor capable of repairing the home of user 108's parents at a reduced rate. In other aspects, and to save time, user 110 may provide input to client device 104 that initiates a transfer of the entire portion of the transferred funds (e.g., virtual currency equivalent to $10,000) to the reputable contractor prior to initiation of the work on the home of user 110's parents. As described above, the provided input may include data identifying user 110, data identifying a recipient of the transfer, and further data identifying one or more parameters of the transfer (e.g., units of virtual currency, a timestamp, etc.). Client device 104 may, in some instances, package and transmit portions of the data identifying the additional transaction to system 140 across network 120 using any of the communications protocols outlined above.

In certain aspects, system 140 may receive the data identifying the additional transaction in step 512 (e.g., as inputted to and transmitted by client device 104). In response to the received data, system 140 may access and decrypt an encrypted list of event triggers using any of the exemplary techniques described above, and may identify the one or more restrictions imposed on the additional transaction by user 108 (e.g., in step 514). Additionally, in some aspects, system 140 may determine whether the additional transaction, as initiated by user 110, conforms to the one or more restrictions imposed by user 108, and thus represents a conforming transaction (e.g., in step 516).

For example, and as described above, system 140 may parse the additional transaction data to determine that user 110 initiated a transfer of a $3,000 portion of the funds transferred by user 108 to a contractor other than the reputable contractor identified by user 108 (e.g., in step 512). As user 108 limited the permissible transaction partners to the reputable contractor, system 140 may determine that the transaction initiated by user 110 represents a non-conforming transaction (e.g., step 516; NO) because the identified transaction partner fails to match the permissible transaction partner identified by user 108 (and included within the decrypted list of event triggers).

If system 140 were to determine that the additional transaction violates at least one of the imposed restrictions (e.g., step 516; NO), system 140 may deem the additional transaction to be a non-conforming transaction, and system 140 may access and decrypt an encrypted rules engine using any of the exemplary techniques described above (e.g., in step 518). In certain aspects, system 140 may parse the decrypted rules engine to identify one or more conditional actions (e.g., as specified by user 108, above) exhibiting a causal relationship with the at least one violated restriction (e.g., in step 520), and may perform operations consistent with the one or more identified conditional actions (e.g., in step 522).

For example, in step 520, system 140 may identify conditional actions within the rules engine that include, but are not limited to, refusing an execution of the non-conforming transaction initiated by user 110 and generate notifications alerting users 108 and 110 of the initiated and refused transaction. In certain aspects, in step 522, system 140 may execute software applications that cancel an execution of the non-conforming transaction initiated by user 110 (e.g., the additional transfer of the funds transferred by user 108 to the other contractor), store data indicative of the cancelled non-conforming transaction in a locally accessible data repository (e.g., within a transaction log of data repository 144), and generate notification data that identifies, among other things, the now-cancelled transaction and the transaction term or terms that conflict with the imposed restriction. System 140 may transmit the generated notification data across network 120 to client devices 102 and 104, which may render and present portions of the generated notification data to users 108 and 110.

In some instances, system 140 may perform operations that generate one or more additional ledger blocks of the accessed hybrid blockchain ledger data structures to record the performance of the identified conditional actions and the cancellation of the non-conforming transaction initiated by user 110 (e.g., in step 524). For example, and using any of the exemplary techniques described above, system 140 may generate transaction data that identifies, among other things, the non-conforming transaction, the transaction parties (e.g., user 110 and the other contractor), one or more transaction parameters (e.g., an amount of the initiated transfer, etc.), one or more of the imposed restrictions, one or more of the transaction parameters that conflicts with corresponding ones of the imposed restrictions (e.g., a conflict between the other contractor and a permissible transaction partner identified by user 108), and/or one or more of the conditional actions performed by system 140. In some aspects, system 140 may transmit the generated transaction data to one or more of peer systems 160, which may incorporate the transaction data into an additional ledger block of the accessed hybrid blockchain ledger using any of the exemplary techniques described above. Exemplary process 500 may then be complete in step 526.

Referring back to step 516, if system 140 were to determine that the additional transaction conforms with the imposed restrictions (e.g., step 518; YES), system 140 may deem the additional transaction to be a conforming transaction, and in step 528, system 140 may system 140 may perform operations that generate one or more additional ledger blocks of the accessed hybrid blockchain ledger data structures to confirm an execution of the additional transaction, which may transfer a portion of the funds previously transferred by user 108 from user 110 to the corresponding transaction partner. For instance, the additional transaction may transfer a $3,000 portion of the transferred virtual currency to the reputable contractor prior to an initiation of the work on the home of user 110's parents, and system 140 may determine that a corresponding transaction type, partners, and parameters of the additional transaction conform to the restrictions imposed by user 108. In some aspects, system 140 may generate transaction data identifying the additional transaction, the transaction partners, and the corresponding parameters, and system 140 may package and transmit the generated transaction data to one or more of peer systems 160, which may operate competitively to verify the parameters of the transaction and generate a new ledger block memorializing the additional transaction using any of the exemplary techniques described above. In some aspects, exemplary process 500 may pass forward to step 526, and exemplary process 500 may be complete.

In the embodiments described above, system 140 may be configured to enforce various restrictions on subsequent transactions involving previously transferred units of virtual currency, such as Bitcoin™. These disclosed embodiments are, however, not limited to these exemplary transactions, and in additional embodiments, system 140 may implement any of the exemplary processes described above to manage and administer any additional or alternate transactions involving earmarked funds trackable using hybrid, blockchain ledger data structures and appropriate to the financial institution.

Further, in certain disclosed embodiments, peer systems 160 represent a public, de-centralized network of "miners" that competitively generate new blocks hybrid blockchain ledgers data structures based on "transaction data" received from various computing systems and devices across network 120 (e.g., system 140 and/or device 104). In other aspects, and consistent with the disclosed embodiments, system 140, maintained and acting on behalf of a rules authority (e.g., a financial institution) may establish, maintain, and distribute one or more the hybrid blockchain data structures using any of the exemplary processes described above.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   at least one processor; and
   a memory storing executable instructions that, when executed by the at least one processor, cause the at least one processor to perform the steps of:
      accessing data maintained within an element of a distributed edger, the accessed data identifying a first transfer of funds from a first party to a second party;
      obtaining first transaction data indicative of an initiation of a second transfer of a portion of the funds from the second party to at least one third party;
      decrypting a first encrypted portion of the accessed data using a private cryptographic key of the first party, the decrypted first data portion identifying one or more restrictions imposed on the second transfer by the first party;
      establishing, based on the first transaction data and the decrypted first data portion, that the initiated second transfer violates at least one of the imposed restrictions;
      decrypting a second encrypted portion of the accessed data using a cryptographic key of a rules authority, the decrypted second data portion identifying at least one rule associated with the at least one violated restriction, and the at least one rule specifying a cancellation of an execution of the initiated second transfer;
      based on the decrypted second data portion, generating an electronic command to cancel the execution of the initiated second transaction, the cancelled execution of the initiated second transfer being consistent with the at least one rule;
      generating an additional element of the distributed ledger that includes second transaction data, the second transaction data comprising information that identifies the second transfer, the at least one violated restriction, and the cancelled execution of the initiated second transfer;
      generating notification data indicative of the cancelled execution of the initiated second transfer, the notification data comprising data identifying at least one of the initiated second transfer, one or more parameters of the initiated second transfer, a timestamp associated with the cancelled execution of the initiated second transfer, or the at least one violated restriction; and
      transmitting the generated notification data to a device associated with at least one of the second or third parties, the generated notification data comprising information that causes an application program executed by the device to present a portion of the generated notification data within a digital interface.

2. The apparatus of claim 1, wherein:
   the decrypted second data portion identifies a plurality of rules associated with the one or more imposed restrictions; and
   the one or more imposed restrictions identify at least one of a permissible transaction type, a permissible transaction partner, or a permissible transaction parameter.

3. The apparatus of claim 2, wherein the executed instructions further cause the at least one processor to perform the steps of:
   determining, based on the decrypted first data portion, that the at least one third party fails to correspond to the permissible transaction partner;
   in response to the determination, establishing the at least one third party as an impermissible transaction partner; and
   identifying, based on the decrypted second data portion, the at least one rule associated with the impermissible transaction partner.

4. The apparatus of claim 2, wherein:
   the permissible transaction parameter comprises a permissible transaction amount; and
   the executed instructions further cause the at least one processor to perform the steps of:
      extracting a transfer amount associated with the second transfer from the first transaction data;

determining that the extracted transfer amount fails to correspond to the permissible transaction amount;

in response to the determination, establishing that the extracted transfer amount represents an impermissible transfer amount; and identifying, based on the decrypted second data portion, the at least one rules associated with the impermissible transfer amount.

5. The apparatus of claim 1, wherein the executed instructions further cause the at least one processor to perform the step of operations comprising transmitting the second transaction data to one or more peer computing systems, the second transaction data comprising additional information that causes the one or more peer systems to generate the additional element of the distributed ledger, the additional element comprising the second transaction data, the first encrypted portion of the accessed data, and the second encrypted portion of the accessed data.

6. The apparatus of claim 1, wherein the executed instructions further cause the at least one processor to perform the steps of:

receiving data identifying at least one additional restriction imposed on the second transfer by the first party;

modifying the decrypted first data portion to incorporate at least a portion of the received data;

encrypting the modified first data portion using the private cryptographic key; and record the encrypted modified first data portion within the additional element of the distributed ledger.

7. The apparatus of claim 1, wherein the executed instructions further cause the at least one processor to perform the steps of:

receiving data identifying at least one additional action, the at least one additional conditional action being associated with at least one of the imposed restrictions;

modifying the decrypted second data portion to incorporate at least a portion of the received data; and encrypting the modified second data portion using the cryptographic key of the rules authority; and record the encrypted modified second data portion within the additional element of the distributed ledger.

8. The apparatus of claim 1, wherein:

the plurality of the rules are established by the rules authority, and the transfer restrictions are controlled by the rules authority;

the cryptographic key of the rules authority corresponds to the master cryptographic key; and the executed instructions further cause the at least one processor to perform the steps of:

generating the master cryptographic key;

storing the generated master cryptographic key in a portion of a secure data repository; and establishing at least one access permission for the stored master cryptographic key, the at least one established access permission preventing at least one of the first, second, or third parties from accessing the stored master cryptographic key.

9. The apparatus of claim 1, wherein the executed instructions further cause the at least one processor to perform the steps of:

loading at least the element of the distributed ledger from the memory;

receiving an updated distributed ledger from one or more peer systems, the updated distributed ledger comprising the additional element that includes the second transaction data; and storing the updated distributed ledger within a portion of the memory.

10. The apparatus of claim 1, wherein the executed instructions further cause the at least one processor to perform the steps of:

generating cancellation data indicative of the cancelled execution of the second transfer; and storing the cancellation data within a transaction log, the transaction log being maintained within the memory.

11. The apparatus of claim 1, wherein the executed instructions further cause the at least one processor to perform the step of storing the additional element of the distributed ledger within a secure data repository.

12. A computer-implemented method, comprising:

accessing, using at least one processor, data maintained within an element of a distributed ledger, the accessed data identifying a first transfer of funds from a first party to a second party;

obtaining, using the at least one processor, first transaction data indicative of an initiation of a second transfer of a portion of the funds from the second party to at least one third party;

using the at least one processor, decrypting a first encrypted portion of the accessed data using a private cryptographic key of the first party, the decrypted first data portion identifying one or more restrictions imposed on the second transfer by the first party;

based on the first transaction data and the decrypted first data portion, establishing, using the at least one processor, that the initiated second transfer violates at least one of the imposed restrictions;

decrypting, using the at least one processor, a second encrypted portion of the accessed data using a cryptographic key of a rules authority, the decrypted second data portion identifying at least one rule associated with the at least one violated restriction, and the at least one rule specifying a cancellation of an execution of the initiated second transfer;

using the at least one processor, generating an electronic command to cancel the execution of the initiated second transaction, the cancelled execution of the initiated second transfer being consistent with the at least one identified rule;

using the at least one processor, generating an additional element of the distributed ledger that includes second transaction data, the second transaction data comprising information that identifies the second transfer, the at least one violated restriction, and the cancelled execution of the initiated second transfer;

using the at least one processor, generating notification data indicative of the cancelled execution of the initiated second transfer, the notification data comprising data identifying at least one of the initiated second transfer, one or more parameters of the initiated second transfer, a timestamp associated with the cancelled execution of the initiated second transfer, or the at least one violated restriction; and transmitting, using the at least one processor, the generated notification data to a device associated with at least one of the second or third parties, the generated notification data comprising information that causes an application program executed by the device to present a portion of the generated notification data within a digital interface.

13. The method of claim 12, wherein:
the decrypted second data portion identifies a plurality of rules associated with the one or more imposed restrictions; and
the one or more restrictions identify at least one of a permissible transaction type, a permissible transaction partner, or a permissible transaction parameter.

14. The method of claim 13, further comprising:
determining, based on the decrypted first data portion, that the at least one third party fails to correspond to the permissible transaction partner;
in response to the determination, establishing the at least one third party as an impermissible transaction partner; and
identifying, based on the decrypted second data portion, the at least one rule associated with the impermissible transaction partner.

15. The method of claim 13, wherein:
the permissible transaction parameter comprises a permissible transaction amount; and
the method further comprises:
extracting a transfer amount associated with the second transfer from the first transaction data;
determining that the extracted transfer amount fails to correspond to the permissible transaction amount;
in response to the determination, establishing that the extracted transfer amount represents an impermissible transfer amount; and
identifying, based on the decrypted second data portion, the at least one rules associated with the impermissible transfer amount.

16. The method of claim 12, further comprising transmitting the second transaction data to one or more peer computing systems, the second transaction data comprising additional information that causes the one or more peer systems to generate the additional element of the distributed ledger, the additional element comprising the second transaction data, the first encrypted portion of the accessed data, and the second encrypted portion of the accessed data.

17. The method of claim 12, further comprising:
receiving data identifying at least one additional restriction imposed on the second transfer by the first party;
modifying the decrypted first data portion to incorporate at least a portion of the received data;
encrypting the modified first data portion using the private cryptographic key; and
recording the encrypted modified first data portion within the additional element of the distributed ledger.

18. The method of claim 12, further comprising:
receiving data identifying at least one additional action, the at least one additional action being associated with at least one of the imposed restrictions;
modifying the decrypted second data portion to incorporate at least a portion of the received data;
encrypting the modified second data portion using the cryptographic key of the rules authority; and
recording the encrypted modified second data portion within the additional element of the distributed ledger.

19. The method of claim 12, wherein:
the plurality of the rules are established by the rules authority, and the transfer restrictions are controlled by the rules authority;
the cryptographic key of the rules authority corresponds to the master cryptographic key; and
the method further comprises:
generating the master cryptographic key;
storing the generated master cryptographic key in a portion of a secure data repository; and
establishing at least one access permission for the stored master cryptographic key, the at least one established access permission preventing at least one of the first, second, or third parties from accessing the stored master cryptographic key.

20. A tangible, non-transitory computer-readable medium storing instructions that, when executed by the at least one processor, cause the at least one processor to perform a method comprising the steps of:
accessing data maintained within an element of a distributed ledger, the accessed data identifying a first transfer of funds from a first party to a second party;
obtaining first transaction data indicative of an initiation of a second transfer of a portion of the funds from the second party to at least one third party;
decrypting a first encrypted portion of the accessed data using a private cryptographic key of the first party, the decrypted first data portion identifying one or more restrictions imposed on the second transfer by the first party;
based on the first transaction data and the decrypted first data portion, establishing that the initiated second transfer violates at least one of the imposed restrictions;
decrypting a second encrypted portion of the accessed data using a cryptographic key of a rules authority, the decrypted second data portion identifying at least one rule associated with the at least one violated restriction, and the at least one rule specifying a cancellation of an execution of the initiated second transfer;
based on the decrypted second data portion, generating an electronic command to cancel the execution of the initiated second transaction, the cancelled execution of the initiated second transfer being consistent with the at least one identified rule;
generating an additional element of the distributed ledger that includes second transaction data, the second transaction data comprising information that identifies the second transfer, the at least one violated restriction, and the cancelled execution of the initiated second transfer;
generating notification data indicative of the cancelled execution of the initiated second transfer, the notification data comprising data identifying at least one of the initiated second transfer, one or more parameters of the initiated second transfer, a timestamp associated with the cancelled execution of the initiated second transfer, or the at least one violated restriction; and
transmitting the generated notification data to a device associated with at least one of the second or third parties, the generated notification data comprising information that causes an application program executed by the device to present a portion of the generated notification data within a digital interface.

* * * * *